(12) United States Patent
Sanger

(10) Patent No.: US 9,073,665 B2
(45) Date of Patent: *Jul. 7, 2015

(54) CONTAINER HAVING DOOR ASSEMBLY AND MULTIPLE LAYERS OF TRACKS

(71) Applicant: Bradford Company, Holland, MI (US)

(72) Inventor: Matthew S. Sanger, West Olive, MI (US)

(73) Assignee: Bradford Company, Holland, MI (US)

( * ) Notice: Subject to any disclaimer, the term of this patent is extended or adjusted under 35 U.S.C. 154(b) by 89 days.

This patent is subject to a terminal disclaimer.

(21) Appl. No.: 13/975,682

(22) Filed: Aug. 26, 2013

(65) Prior Publication Data

US 2015/0053691 A1    Feb. 26, 2015

(51) Int. Cl.
*B65D 25/02* (2006.01)
*B65D 19/08* (2006.01)
*B65D 19/44* (2006.01)
*B65D 25/00* (2006.01)

(52) U.S. Cl.
CPC ............... *B65D 19/08* (2013.01); *B65D 19/44* (2013.01); *B65D 2519/00024* (2013.01); *B65D 2519/00029* (2013.01); *B65D 2519/00034* (2013.01); *B65D 2519/00059* (2013.01); *B65D 2519/00094* (2013.01); *B65D 2519/00233* (2013.01); *B65D 2519/00273* (2013.01); *B65D 2519/00288* (2013.01); *B65D 2519/00293* (2013.01); *B65D 2519/00323* (2013.01); *B65D 2519/00333* (2013.01); *B65D 2519/00373* (2013.01); *B65D 2519/00497* (2013.01); *B65D 2519/00502* (2013.01); *B65D 2519/00562* (2013.01); *B65D 2519/00626* (2013.01); *B65D 2519/00666* (2013.01); *B65D 2519/00701* (2013.01); *B65D 2519/0082* (2013.01); *B65D 2519/0097* (2013.01); *B65D 2585/6882* (2013.01); *B65D 25/005* (2013.01); *B65D 2519/00805* (2013.01)

(58) Field of Classification Search
CPC ........ B65D 25/04; B65D 25/06; B65D 19/08; B65D 19/44; B65D 25/005; B65D 2519/00666; B65D 2519/00805; B65D 2585/6882; E05D 15/10
USPC ........... 220/9.2, 9.4, 7; 49/213, 226, 225, 209
See application file for complete search history.

(56) References Cited

U.S. PATENT DOCUMENTS

| | | |
|---|---|---|
| 634,589 A | 10/1899 | Russell |
| 1,712,168 A | 5/1929 | Rand, Jr. |
| 4,527,694 A | 7/1985 | Bolt et al. |

(Continued)

FOREIGN PATENT DOCUMENTS

| | | |
|---|---|---|
| DE | 19549166 | 3/1997 |
| DE | 20101374 | 4/2001 |

(Continued)

*Primary Examiner* — Stephen Castellano
(74) *Attorney, Agent, or Firm* — Wood, Herron & Evans, LLP

(57) ABSTRACT

A container for holding product therein during shipment and being returned for reuse has a movable door assembly, frame, tracks supported by opposite sides of the frame, and a plurality of support member assemblies extending between the tracks. Each support member assembly comprises end members and a tubular support, the end members being movable in the tracks. The support member assemblies support dunnage for supporting products for storage or shipment.

22 Claims, 27 Drawing Sheets

(56) References Cited

U.S. PATENT DOCUMENTS

| | | | |
|---|---|---|---|
| 4,602,815 A | 7/1986 | Boots et al. | |
| 4,685,571 A | 8/1987 | Hoss | |
| 4,721,317 A | 1/1988 | Avot | |
| 4,770,314 A | 9/1988 | Giesler | |
| 4,821,879 A | 4/1989 | Kupersmit | |
| 4,864,686 A | 9/1989 | Lasier et al. | |
| 4,988,006 A | 1/1991 | Lundin | |
| 5,238,139 A | 8/1993 | Bisceglia | |
| 5,324,105 A | 6/1994 | Christensen | |
| 5,407,262 A | 4/1995 | Christian et al. | |
| 5,560,507 A | 10/1996 | Arpin et al. | |
| 5,725,119 A | 3/1998 | Bradford et al. | |
| 5,813,566 A | 9/1998 | Bradford et al. | |
| 5,815,903 A | 10/1998 | Foster et al. | |
| 6,062,410 A | 5/2000 | Bradford et al. | |
| 6,164,440 A | 12/2000 | Van Bree | |
| 6,202,884 B1 | 3/2001 | Verkerke | |
| 6,230,916 B1 | 5/2001 | Bradford et al. | |
| 6,305,764 B1 | 10/2001 | Kortman et al. | |
| 6,540,096 B1 | 4/2003 | Bazany et al. | |
| 6,830,156 B2 | 12/2004 | MacKelvie | |
| 7,125,062 B2 | 10/2006 | Kiester et al. | |
| 7,748,559 B2 | 7/2010 | Bradford | |
| 7,762,422 B2 | 7/2010 | Dobrinski | |
| 7,870,970 B2 * | 1/2011 | Fisk | 220/7 |
| 8,100,282 B2 | 1/2012 | Nyeboer et al. | |
| 8,308,015 B2 | 11/2012 | Bradford et al. | |
| 8,375,646 B2 * | 2/2013 | Newkirk et al. | 52/29 |
| 2003/0168461 A1 | 9/2003 | Richardson | |
| 2006/0249514 A1 | 11/2006 | Bazany et al. | |
| 2006/0249515 A1 | 11/2006 | Dobrinski | |
| 2008/0023470 A1 | 1/2008 | Bradford | |
| 2008/0078729 A1 | 4/2008 | Bazany et al. | |
| 2010/0072206 A1 | 3/2010 | Doyle | |
| 2012/0043865 A1 * | 2/2012 | Newkirk et al. | 312/209 |
| 2012/0061387 A1 | 3/2012 | Nam | |
| 2013/0057135 A1 | 3/2013 | Bradford et al. | |
| 2014/0076754 A1 * | 3/2014 | Bradford et al. | 206/335 |
| 2014/0077674 A1 * | 3/2014 | Bradford et al. | 312/321 |

FOREIGN PATENT DOCUMENTS

| | | |
|---|---|---|
| DE | 20318172 | 5/2004 |
| FR | 1455414 | 4/1966 |
| FR | 2860504 | 4/2005 |
| JP | 6-59230 | 8/1994 |
| WO | 9310024 | 5/1993 |

* cited by examiner

CONTAINER HAVING DOOR ASSEMBLY AND MULTIPLE LAYERS OF TRACKS

FIELD OF THE INVENTION

The present invention relates to containers for use in shipping and, more particularly, to containers with movable members for supporting product.

BACKGROUND OF THE INVENTION

A large number of different container structures are utilized by manufacturers to ship a variety of different products to end users, which may be, for example, assembly plants. In the automobile industry, for example, an assembly plant assembling a particular automobile might utilize a number of different parts from different manufacturers. These manufacturers ship their respective parts to the assembly plant in container structures where the parts are then removed from dunnage or support members inside the container structure and assembled into a finished automobile.

Access to the product in the containers is of particular concern. Specifically, in the automotive industry, the containers full of product are positioned on an assembly line adjacent to a work area, which is associated with a particular product to be installed on a manufactured vehicle. For example, a container full of interior door panels is usually positioned next to a particular station on an assembly line where interior door panels are installed so that a line worker may easily access the door panels inside the container. The product or part is taken directly from the container and used on the line. Some existing containers are difficult to access, which makes removal of the parts therein difficult and time-consuming. For example, some containers are configured so that a line worker must walk around the container to remove parts or products from opposite ends of the container. As may be appreciated, a line worker only has a certain amount of time to install a part. Any delay in access and removal of the part from the container is undesirable.

In many containers, a line worker or employee must insert or remove parts from a distal or rear part of the container. The size and/or weight of the parts or workpieces may cause stress or strain on the line worker and, more particularly, on the back of the worker when inserting or removing parts from such a container. Such ergonomically unfriendly movements may cause physical trauma, pain and other injuries that may lead to lost production time.

In some situations, in order to alleviate such stress and/or strain on his or her body, the line worker may move to the rear or opposite end of the container to remove parts from inside the container. This requires space around the container which may not be available, depending on the physical layout of the plant or facility. The length (front to back) of certain containers may be limited because the container manufacturer needs to eliminate the need for a line worker to walk around the container to remove product from inside the container. Such containers having a reduced length reduce the number of parts or products which may be shipped and/or stored in the container. The more containers needed to ship a predetermined number of parts, the greater the cost to the shipper.

In other containers, a line worker or employee must lean forward and bend down into the container to insert or remove a part or workpiece from a lower portion of the container. This movement by the line worker is ergonomically unfriendly because the line worker must lean forward and bend down and lift a part or workpiece up and over a wall into the container to remove the part or workpiece from inside the container. Similarly, when a part or workpiece must be inserted into a container, the line worker may have to lean forward and insert the part, which may be heavy, into its proper location inside the container, again experiencing ergonomically unfriendly movements. Such movements may be necessary with many top loading containers and/or containers having multiple layers or levels of parts.

Depending upon the number of times the line worker repeats this unnatural motion into the interior of the container, strain in the back, legs and arms may result. The size and/or weight of the parts or workpieces may increase the strain on the line worker. Thus, simply removing multiple parts during a work day may cause physical trauma, pain and other injuries that may lead to lost production time.

Accordingly, there is a need for a container which prevents employees from walking around the container to insert or remove product from inside the container.

There is further a need for a container which prevents employees from having to perform difficult or straining repetitive reaching motions.

There is further a need for a container which brings product into an ergonomically friendly area or zone for insertion or removal of the product.

SUMMARY OF THE INVENTION

The present invention provides a container for holding product therein during shipment. The container comprises a frame having a bottom and multiple sides. The frame is commonly made of metal, but may be made of any desired materials. In one embodiment, a plurality of straps is secured to opposed sides of the frame. A plurality of generally horizontally oriented tracks is secured to the straps on each of the opposed sides of the frame at vertically spaced levels.

The container further comprises a plurality of movable support member assemblies that are supported by the tracks. Each support member assembly extends between opposed tracks of the same layer or level. For purposes of this document, the term "support member assembly" comprises multiple components secured together. For example, a "support member assembly" may comprise in combination a tubular support and a pair of end members which move or slide inside stationary tracks. If desired, a unitary support member may be used in place of a support member assembly.

For purposes of the present invention, the term "track" may be a unitary member or multiple components secured together. The present invention is not intended to be limited to the tracks like those illustrated and described herein. For example, a "track" may comprise a rail attached to one or more walls of a container. The term "track" is intended to include any number of stationary objects along which support members or support member assemblies, as defined and/or illustrated herein, may slide or move during the loading or unloading of products from dunnage inside the container.

The container further comprises dunnage supported by the support member assemblies. The dunnage may be pouches or any other known dunnage. The dunnage may be secured to the support member assemblies in any known manner, including those disclosed in U.S. patent application Ser. No. 13/896,675, which is fully incorporated by reference herein.

The container further comprises a movable door assembly on one side of the container which may be lowered for ergonomic reasons. The door assembly is movable between raised and lowered positions. The door assembly has pins adapted to move in slots of guide members secured to the frame. An operator may find loading and/or unloading parts from the dunnage in the container to be easier and less stressful on his/her body when the door assembly is in a lowered position.

In an alternative embodiment, the container may have two door assemblies on opposed sides of the container. Each of the door assemblies, regardless of whether the container has one or two door assemblies, may comprise multiple segments, at least one of which may be movable.

According to another aspect of the present invention, the container has a metal frame having a base and opposed sides. The container further comprises a plurality of tracks supported by opposed sides of the frame at vertically spaced levels. A plurality of movable support member assemblies extend between opposed tracks of each level, each of the support member assemblies comprising a pair of end members movable along the tracks and a support extending between the end members. Pouches are supported by the support member assemblies. A door assembly is movable between a raised position and a lowered position, the door assembly having multiple pins on each side. The pins are adapted to move in slots of guide members secured to the metal frame.

According to another aspect of the invention, a method of loading a container with products for shipment comprises multiple steps. The first step comprises lowering a movable door assembly, the movable door assembly having pins movable in slots of guide members to enable the door assembly to be raised and lowered in a controlled manner. The next step comprises moving a plurality of upper support member assemblies supporting an upper layer of pouches away from an operator. Each of the upper support member assemblies comprises a pair of end members and a tubular support extending between the end members, the end members moving in upper tracks secured to the container at the same level. The next step comprises moving a plurality of lower support member assemblies supporting a lower layer of pouches to a position near the operator. Each of the lower support member assemblies comprises a pair of end members and a tubular support extending between the end members, the end members moving in lower tracks secured to the container at the same level. The next step comprises inserting products into pouches of the lower layer of pouches. The next step comprises moving the upper support member assemblies supporting the upper layer of pouches proximate the operator after the lower layer of pouches is loaded and inserting additional products into the pouches of the upper layer of pouches one pouch at a time and moving the loaded pouches of the upper layer of pouches away from the operator one at a time. The last step comprises raising the door assembly.

According to another aspect of the invention, a method of unloading products from inside a container comprises multiple steps. The first step comprises lowering an upper door segment of a door assembly, such that pins attached to the upper door segment move in slots of guide members to enable the upper door segment to be lowered in a controlled manner. The next step comprises removing products supported by an upper layer of pouches. Each of the pouches of the upper layer of pouches extends between a pair of support member assemblies. Each of the support member assemblies comprises a pair of end members and a tubular support extending between the end members and surrounding portions of the end members. The next step comprises moving the upper layer of empty pouches to a position away from an operator in which they do not interfere with unloading a lower layer of pouches, the end members moving in tracks secured to opposed sides of the container at the same level. The next step comprises removing products supported by pouches of a lower layer of pouches, each pouch of the lower layer being supported by two support member assemblies. The last step comprises raising the upper door segment of the door assembly to a locked position.

The container may be adapted so that an operator located at the front of the container may pull product to be emptied from the rear of the container forwardly to a more ergonomically friendly position after products suspended from dunnage at the front of the container have been unloaded or removed. Thus, a person unloading the container from the front or proximal location of the container will not have to stretch or reach to the back of the container to unload remaining product.

Similarly, a person loading the container from the front of the container need not stretch or reach to the back of the container to insert or load product into the container. The loader of the container may push the support member assemblies and associated dunnage loaded with product rearwardly and load additional product in a more ergonomically friendly position or manner. For example, after product is loaded into dunnage suspended by adjacent support member assemblies, these support member assemblies and associated dunnage are pushed rearwardly to enable the loader to load additional product. Thus, the container allows product to be more efficiently and safely removed from the container or inserted therein without unnecessary stress or strain on the operator.

The sliders or end members may be made of plastic or any other desired material. The sides of the container have horizontally oriented tracks in which the sliders move to move dunnage supported by the support member assemblies closer to the user for loading or unloading product. Each slider may have at least one head located inside the interior of the track so the slider remains engaged with the track. The slider may have another head outside the track for preventing the dunnage material from entering the interior of the track.

The horizontally oriented tracks may have openings therein and removable caps for covering and/or closing the openings. If one or more of the supports or support member assemblies needs to be removed or inserted, a person may remove and/or insert one or more support member assemblies via the openings in opposed tracks.

The ease of operation and other objects and advantages of the present invention shall be made apparent from the accompanying drawings and the brief description thereof.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

FIG. 6I is a cross-sectional view of the container of FIG. 1, showing the door assembly lowered and a first product being loaded into the second lowest layer of dunnage;

DETAILED DESCRIPTION OF THE INVENTION

Figure 1:
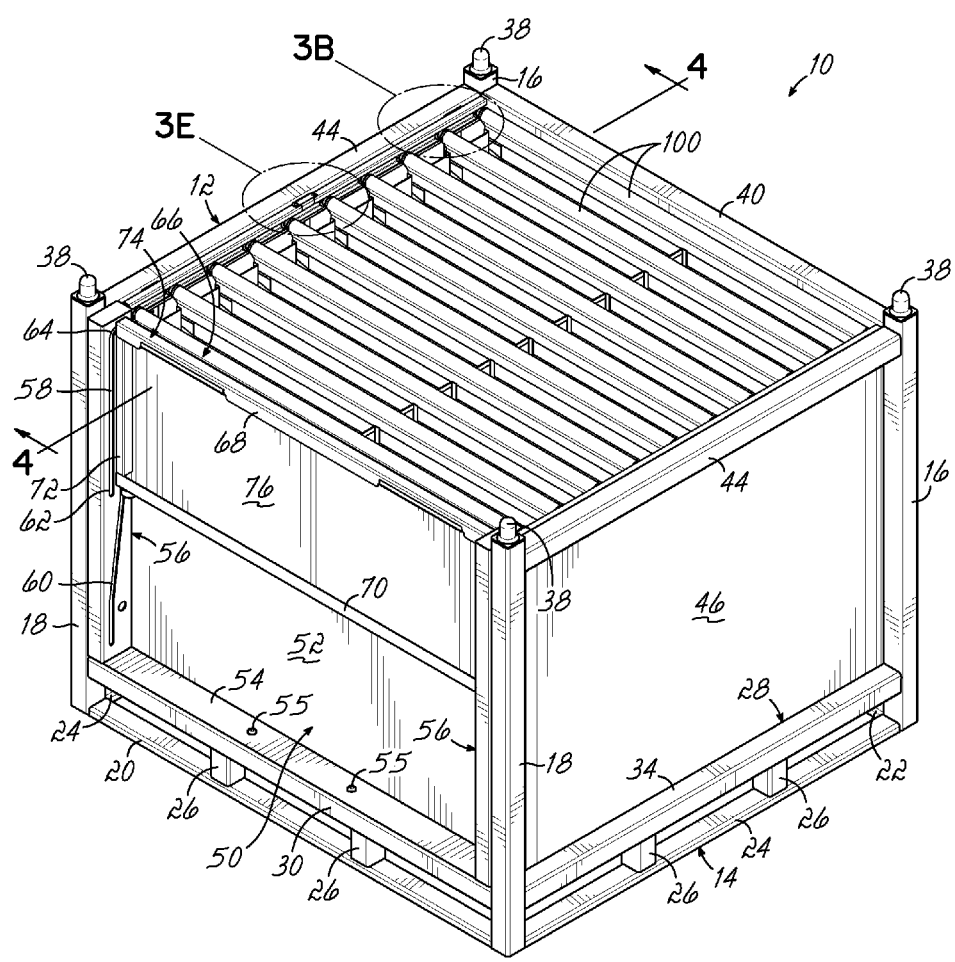
FIG. 1 is a perspective view of one embodiment of a reusable and returnable container.

Referring to FIG. 1, there is illustrated a reusable and returnable container 10 according to one embodiment. The reusable and returnable container 10, as shown, comprises an outer metal frame 12 having a base 14, two rear corner posts 16 and two front corner posts 18, all four corner posts 16, 18 extending upwardly from the base 14.

Figure 2:
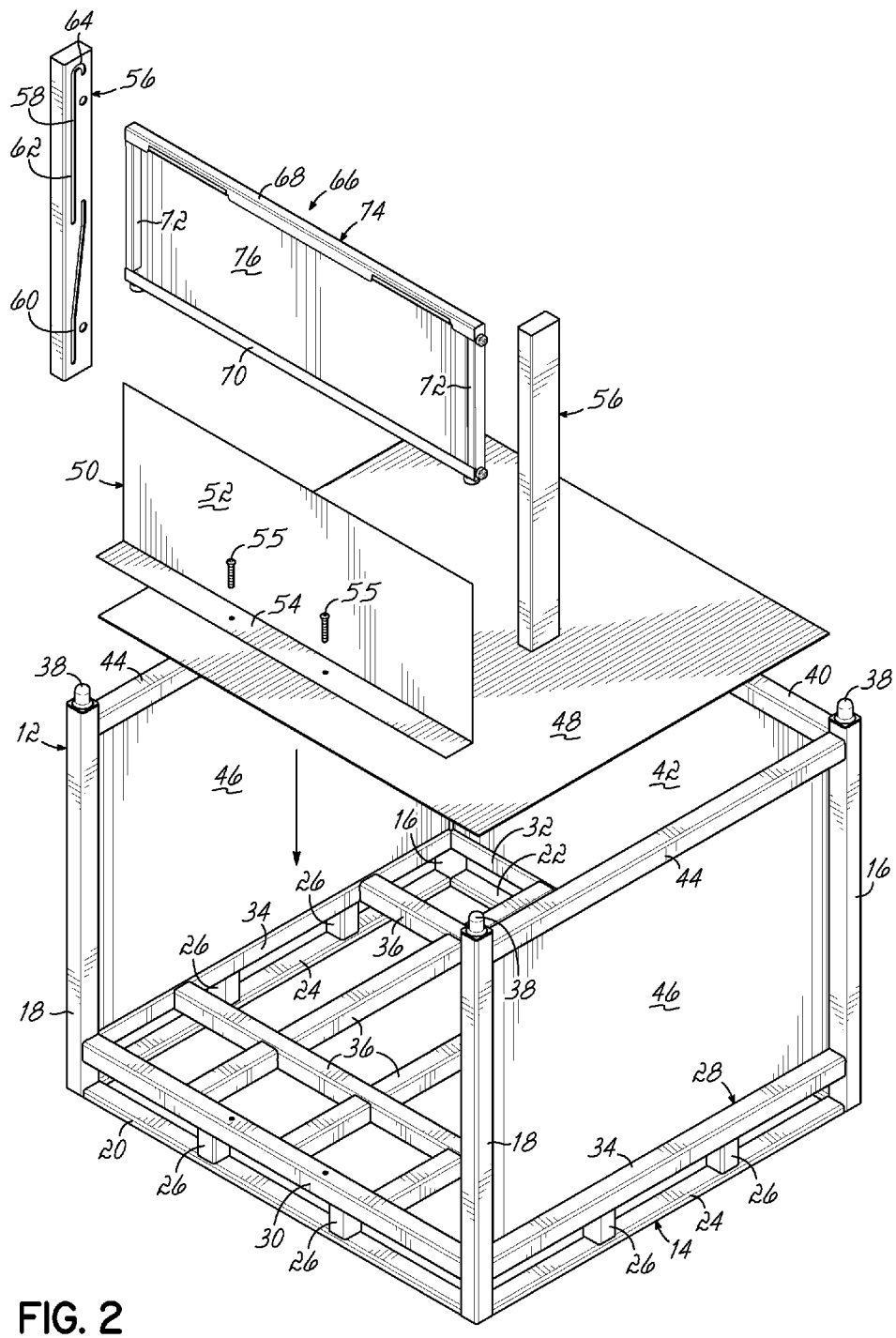
FIG. 2 is a partially disassembled view of a portion of the container of FIG. 1.

As best shown in FIG. 2, the base 14 is generally rectangular in shape and comprises a front member 20, a rear member 22 and two side members 24. The members of the base 14 may be secured together or secured to the corner posts 16, 18 via any conventional means, including welding. A plurality of stubs 26 extend upwardly from the base 14 and are secured thereto by welding, for example.

As best shown in FIG. 2, a generally rectangular sub-base 28 is spaced above the base 14 by the stubs 26 and secured to the stubs 26 by welding, for example. The sub-base 28 comprises a front member 30, a rear member 32 and two side members 34. The members of the sub-base 28 may be secured together or secured to the corner posts 16, 18 via any conventional means, including welding. Although two stubs 26 are shown extending upwardly from each of the base members 20, 22 and 24 to corresponding sub-base members 30, 32 and 34, any number of stubs 26 may be used to space the sub-base 28 above the base 14.

Figure 3:
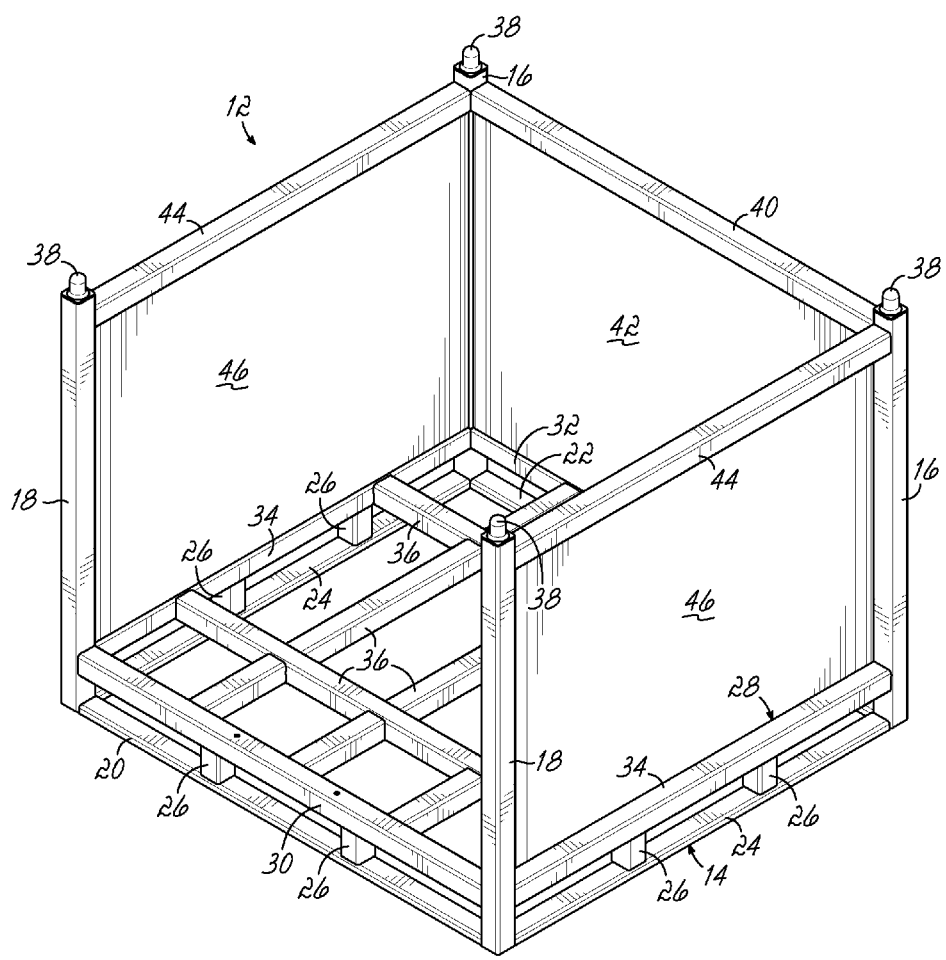
FIG. 3 is a perspective view of a portion of the container of FIG. 1.

As best shown in FIGS. 2 and 3, the sub-base 28 of the container 10 further comprises a plurality of intersecting interior members 36 extending between opposed perimeter sub-base members 30, 32 and 34 and secured thereto, interior members 36 comprising part of the sub-base 28 of the metal frame 12. Although five interior members 36 are shown in the sub-base 28 of the container 10, any number of interior members may be used.

Figure 4:
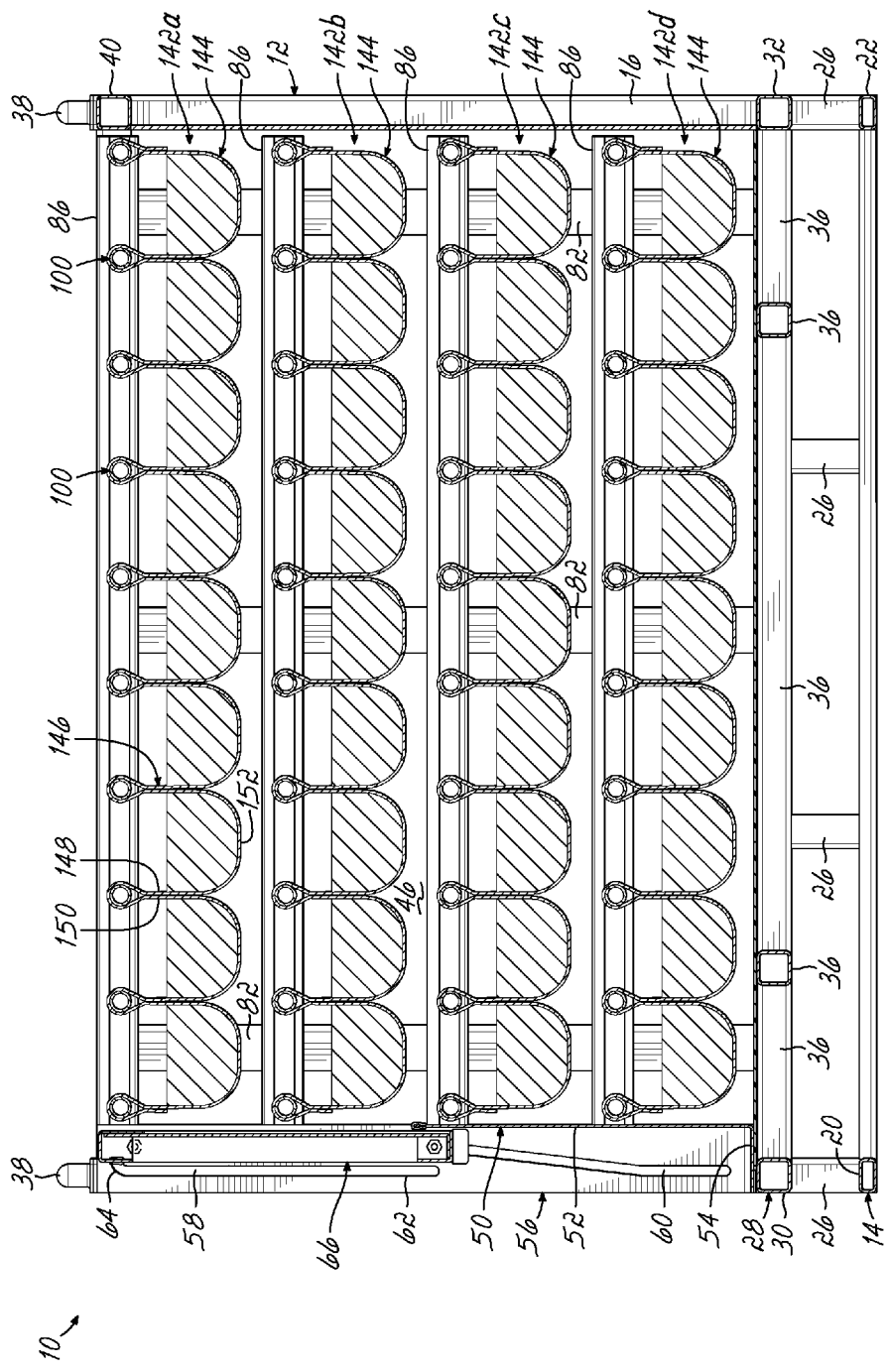
FIG. 4 is a cross-sectional view of the container of FIG. 1, the container being fully loaded with product.

As best shown in FIG. 4, each of the corner posts 16 and 18 may be generally rectangular in cross-section, have a hollow interior, and a knob 38 at the top thereof for stacking purposes so that multiple containers 10 may be stacked upon one another. The knobs 38 of a first container fit inside the hollow interiors of the corner posts of another or second container located above the first container for stacking purposes.

As best shown in FIG. 3, metal frame 12 further comprises an upper rear member 40 and a rear panel 42 extending between the two rear corner posts 16 and being secured thereto. The rear panel 42 is below the upper rear member 40. The metal frame 12 further comprises, on each side of the container, an upper side member 44 and a side panel 46 extending between one of the rear corner posts 16 and one of the front corner posts 18 and secured thereto. On each side, upper side member 44 is located above side panel 46.

Although one type of metal frame is illustrated, the present invention may be used with other types or configurations of outer metal frames. For example, each side wall may not be a solid wall.

As best illustrated in FIG. 2, a floor 48 rests on top of sub-base 28 of the metal frame 12 of container 10. The floor 48 may be made of plastic, wood, metal or any other desired material. Although the floor 48 is illustrated as being one piece or panel, more than one piece or panel may comprise the floor 48 resting on top of sub-base 28 of the metal frame 12 of container 10.

As best shown in FIG. 2, container 10 further comprises a shield 50 which may be secured with fasteners or welded to the front member 30 of the sub-base 28 of the container 10. More particularly, the shield 50 has a main portion 52 which is generally vertically oriented upon assembly and a flange 54 extending outwardly from the main portion 52. The flange 54 is generally horizontally oriented upon assembly and may be secured in any known manner to the front member 30 of the sub-base 28 of the container 10 including with any number of fasteners 55 (only two being shown) or via welding.

As best shown in FIG. 2, the container 10 further comprises two guide members 56, one of the guide members 56 being fixedly secured to each of the front corner posts 18 of the container 10 via welds or fasteners. Each of the guide members 56 is generally rectangular in cross-section and has a hollow interior. Each of the guide members 56 has two slots therethrough, an upper slot 58 and a lower slot 60. As best shown in FIG. 2, upper slot 58 has a "candy cane" shape comprising a straight portion 62 and a curved upper portion 64. These upper and lower slots 58, 60 are used to secure a movable door assembly 66 in a fixed position and guide the door assembly 66 during its movement from an upper or raised position shown in FIG. 5A and a lower or dropped position shown in FIG. 5C. As best shown in FIG. 2, the door assembly 66 comprises an upper piece 68, which may function as a handle, a lower piece 70 and two side pieces 72 joined together to create a rectangular frame 74 inside which is a door panel 76. In one embodiment, the door panel 76 is made of plastic and the frame 74 made of metal. However, any desired materials may be used.

Figure 5A:
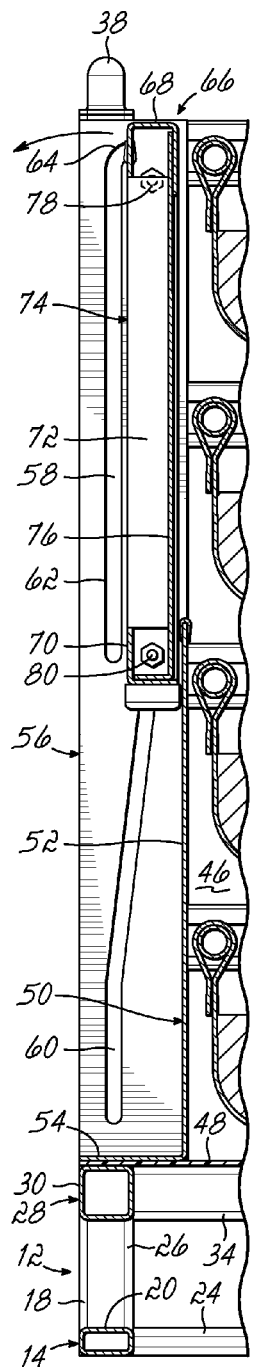
FIG. 5A is a cross-sectional view of a portion of the container of FIG. 1, showing the door assembly being lowered.
Figure 5B:
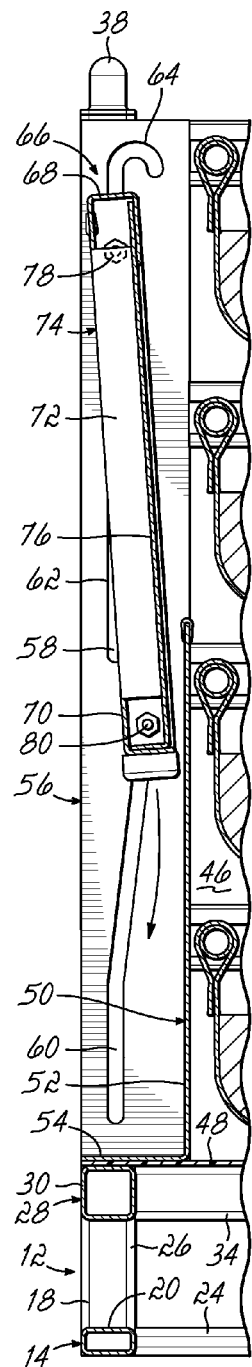
FIG. 5B is a cross-sectional view of a portion of the container shown in FIG. 1, showing the door assembly being lowered further.
Figure 5C:
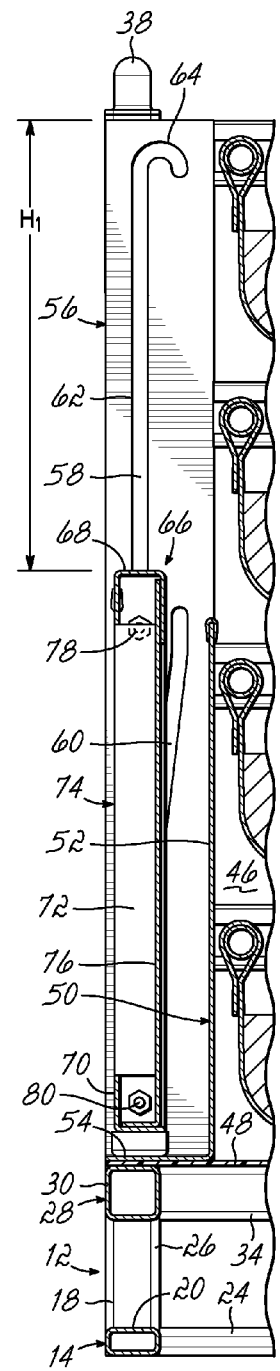
FIG. 5C is a cross-sectional view of a portion of the container shown in FIG. 1, showing the door assembly being in a lowered position.

As best shown in FIGS. 5A-5C, the door assembly 66 has a pair of upper pins 78, one on each side (only one being shown) extending outwardly from the door assembly 66 and adapted to ride or move inside the upper slots 58. Similarly, the door assembly 66 has a pair of lower pins 80 extending outwardly from the door assembly 66, one on each side (only one being shown). These pins 80 are adapted to ride or move inside the lower slots 60. FIG. 2 shows the door assembly 66 locked in a raised position with the upper pins 78 located at the outer ends of the curved portions 64 of the upper slots 58. As the door assembly 66 is lowered, it moves outside the shield 50. See FIG. 5C.

As best shown in pending U.S. patent application Ser. No. 13/896,675, fully incorporated herein, multiple stops, or a continuous stop (not shown), may be secured to door assembly 66. The stop or stops may be made of foam or any other suitable material. When the door assembly 66 is in its raised position, the stop or stops may prevent products from hitting the door assembly 66 during the loading or unloading process.

Figure 3A:
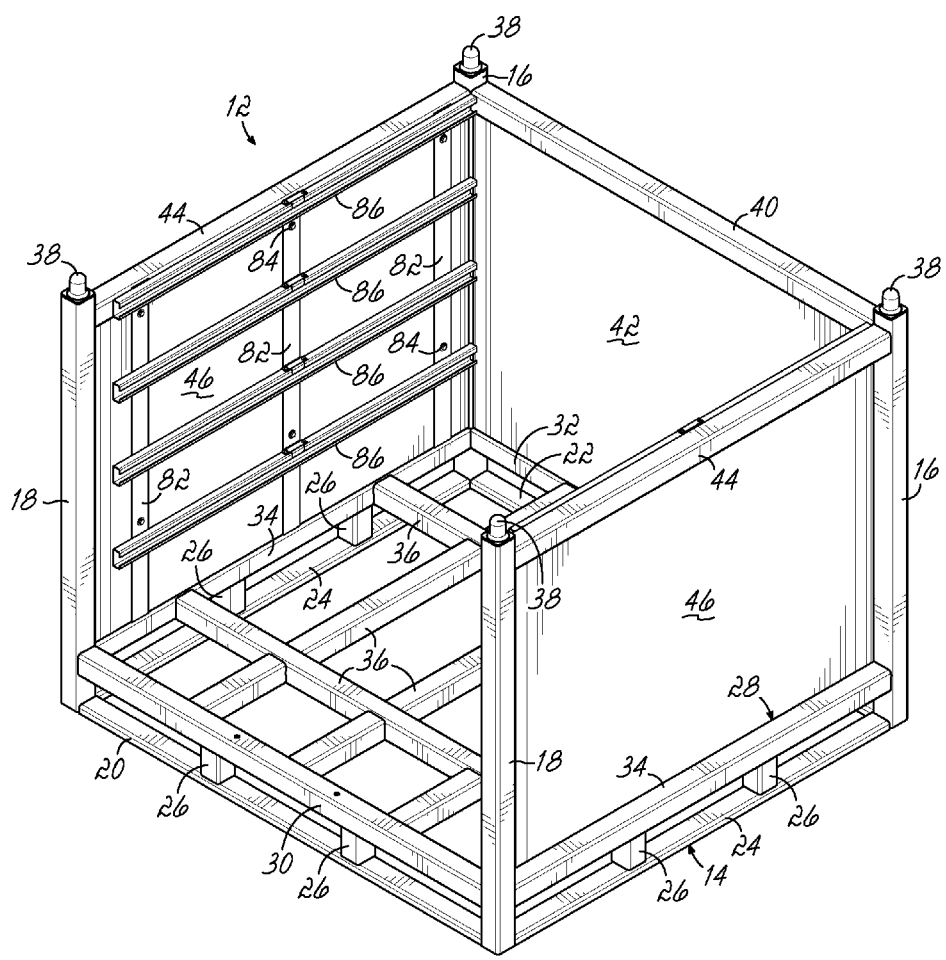
FIG. 3A is a perspective view of a portion of the container of FIG. 1.

As best shown in FIG. 3A, container 10 further comprises a plurality of generally vertically oriented spaced straps 82 secured to each of the side panels 46 with fasteners 84 (only one set of straps 82 being shown). Although the drawings show three straps 82 secured to each side of the container, any number of vertically oriented straps may be secured to each side of the container. The straps 82 may be made of metal or any other desired material.

As shown in FIG. 3A, a plurality of generally horizontally oriented tracks or rails 86 are secured to the straps 82 in any desired manner, such as welding, for example. The tracks 86 are vertically spaced apart from each other at different levels. The tracks 86 are fixed in stationary positions in corresponding pairs at the same vertical levels as disclosed in pending U.S. patent application Ser. No. 13/896,675. Although FIG. 3A discloses four different levels or layers of tracks 86 (only one side being shown), the container may have any number of different levels or layers of tracks 86.

Figure 3B:
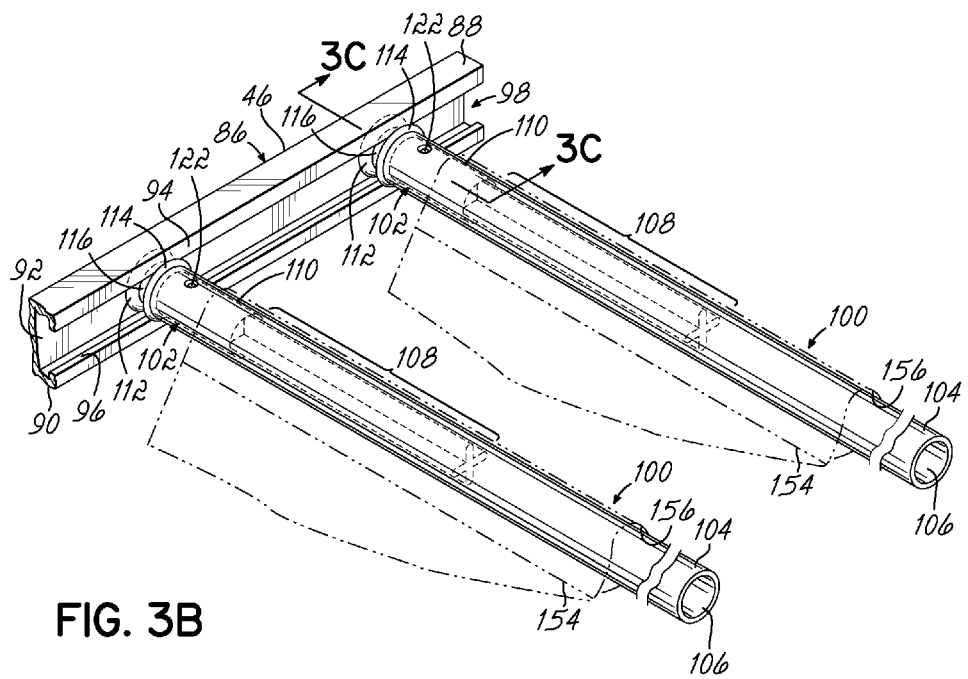
FIG. 3B is an enlarged view of the encircled area 3B of FIG. 1.

As best shown in FIG. 3B, each track 86 has an upper wall 88, a lower wall 90 joined to the upper wall 88 by a side wall 92, and a lip 94 extending downwardly from the upper wall 88 and another lip 96 extending upwardly from the lower wall 90 defining an interior 98 of the track 86.

Referring to FIG. 1, container 10 further comprises a plurality of support member assemblies 100 extending between opposed tracks 86 at the same level on opposed sides of the container. As disclosed in pending U.S. patent application Ser. No. 13/896,675, each support member assembly 100 includes a pair of sliders or end members 102 and a tubular support 104 having a hollow interior 106 extending therebetween. The sliders 102 are preferably made of injection molded plastic, such as nylon, but may be made of any other material. The tubular support 104 is preferably made of metal, but may be made of other suitable material, such as plastic.

As shown in FIG. 3B, each slider 102 preferably has a first portion 108 having an X-shaped cross-sectional configuration and a second portion 110 having a circular cross-sectional configuration. Although one configuration of slider 102 is illustrated, any type or configuration of slider may be used with the present invention. In this embodiment, each slider 102 has a pair of heads 112, 114 at the end of the slider 102. Head 112 is furthest from the first portion 108 of the slider 102, and head 114 is spaced inwardly from head 112. The heads 112, 114 are spaced from one another to define a groove 116 therebetween which receives and retains the lips 94, 96 of the stationary track 86. As shown in FIG. 3B, head 112 is located inside the interior 98 of track 86, and head 114 is located outside the interior 98 of stationary track 86. Head 112 keeps the slider 102 engaged with the track 86, while head 114 keeps the dunnage material out of the interior 98 of the track 86, thereby ensuring that the sliders 102 may move smoothly along the stationary track. Although one configuration of support member assembly 100 is illustrated, the present invention may be used with any type or configuration of support member assembly for supporting dunnage so the dunnage may slide or move inside the container.

As shown in FIG. 3B, each end of tubular support 104 fits over at least one portion 108 of a slider 102. An end surface 118 of tubular support 104 abuts head 114 of slider 100. Each end member or slider 102 of each support member assembly 100 is adapted to engage and move along one of the tracks. The end members 102 preferably slide along the length or width of the tracks; however, different end members may rotate rather than slide along the tracks. Although one configuration of track and end member is shown and described, other types of end members and tracks may be used if desired.

Figure 3C:
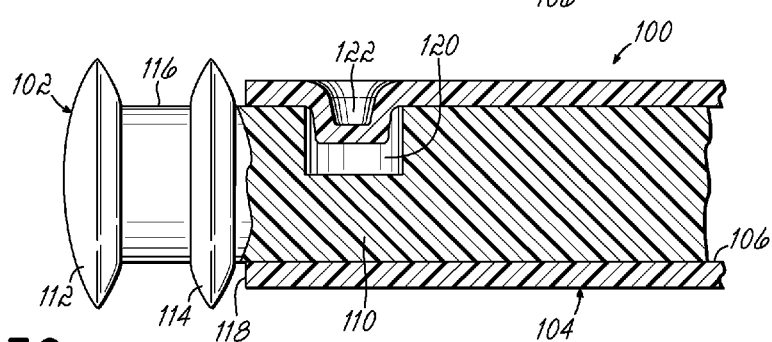
FIG. 3C is a view taken along the line 3C-3C of FIG. 3B.

As best shown in FIG. 3C, support member assembly 100 includes a pair of sliders 102 (only one being shown in FIG. 3C). Each slider 102 has a groove 120 formed in a portion 110 therein. Support member assemblies 100 further include a tubular support 104 having a hollow interior 106 extending therebetween. As shown in FIG. 3B, each end of tubular support 104 fits over at least one portion 108 of a slider 102. An end surface 118 of tubular support 104 abuts head 114 of slider 102. The tubular support 104 is preferably made of metal, but may be made of other suitable material, such as plastic. As shown in FIG. 3C, tubular support 104 has two detents 122 therethrough (one at each end) in which the material of the tubular support 104 is pressed downwardly into the groove 120. This attachment between each of the two sliders 102 and the tubular support 104 enables some movement therebetween. Such interaction between the sliders 102 and tubular support 104 allows for a tolerance of approximately one-quarter inch on each side. The detents 122 prevent separation of the tubular support 104 from the sliders 102 while allowing some movement therebetween as the detents 122 move within the grooves 120 formed in the sliders 102.

Figure 3D:
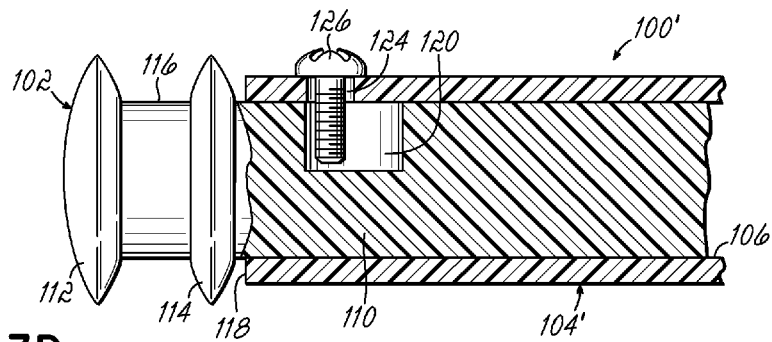
FIG. 3D is a cross-sectional view of a portion of an alternative support member assembly.

As shown in FIG. 3D, a slightly different support member assembly 100', including a pair of sliders 102 (only one being shown in FIG. 3D), may be used. Support member assembly 100' is slightly different than support member assembly 100 shown in FIG. 3B and described above. As shown in FIG. 3D, the only difference between support member assembly 100' and support member assembly 100 shown in FIG. 3B is that tubular supports 104' are slightly different than the tubular supports 104; they lack detents 122. See FIG. 3C. Each support member assembly 100' includes a tubular support 104' having a hole 124 at each end. The tubular support 104' is preferably made of metal, but may be made of other suitable material, such as plastic. As shown in FIG. 3D, each end of tubular support 104' fits over at least one portion 108 of a slider 102. An end surface 118 of tubular support 104' abuts head 114 of slider 102. As shown in FIG. 3D, tubular support 104' has holes 124 therethrough, which receive fasteners 126. Although fasteners 126 are shown as screws, they may be any other type of fasteners. The fasteners 126 prevent separation of the tubular support 104' from the sliders 102 while allowing some movement therebetween as the fastener 126 moves within the grooves 120 formed in the sliders 102. Other known means of securing the tubular support 104 to the sliders 102 may be used if desired.

FIGS. 1 and 3B illustrate all of the support member assemblies 100 having detents 122, as shown in FIG. 3B. Alternatively, containers may be made with all of the support member assemblies having fasteners, like support member assemblies 100'. Alternatively, some of the support member assemblies may have fasteners like support member assemblies 100', and some may have detents like support member assemblies 100. Containers may have a mixture thereof.

Figure 3E:
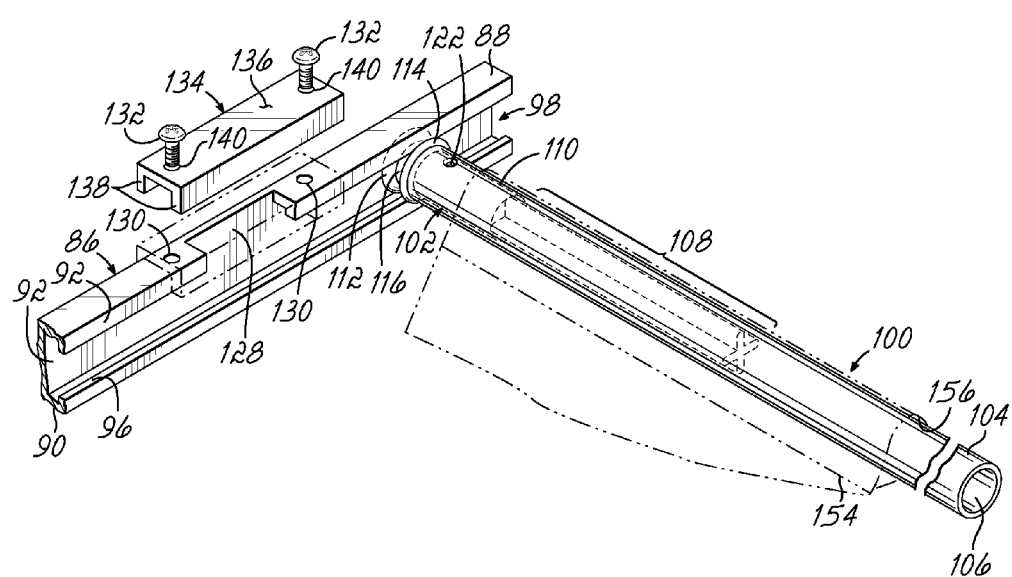
FIG. 3E is an enlarged view of the encircled area 3E of FIG. 1.

FIG. 3E illustrates another support member assembly 100, exactly like the one shown in FIG. 3B, used to support one of the pouches. However, FIG. 3E illustrates another innovative feature or aspect of the invention. Track 86 has an opening or cut-out 128 formed therein. Holes 130 are formed in the upper wall 88 of track 86, which are sized and threaded to receive fasteners 132. Although fasteners 132 are illustrated to be screws, they may be any other desirable fastener. A cap 134 is removably secured to the track 86 to cover the opening or cut-out 128 formed in an upper portion of track 86. As best seen in FIG. 3E, cap 134 has a generally inverted U-shaped cross-sectional configuration, including a top portion 136 and side portions 138 extending downwardly from the top portion 136. Holes 140 are formed through the top portion 136 of the cap 134 and sized to receive fasteners 132, as shown in FIG. 3E. The fasteners 132 are adapted to pass through the holes 140 in the cap 134 and into the holes 130 in the upper wall 88 of the track 86. Caps of alternative shapes or sizes may be used if desired.

When one of the sliders 102 or any part of support member assemblies 100, 100' are damaged or need to be replaced for any reason, one may remove cap 134 after loosening fasteners 132, thereby exposing the opening or cut-out 128 of track 86. The support member assemblies 100, 100' may then be removed or inserted as necessary to repair or replace the damaged part or parts.

As best shown in FIG. 4, container 10 comprises multiple layers or levels 142a-142d of vertically spaced dunnage 144, each level being in the form of a plurality of pouches 146. Each layer or level of dunnage is suspended by and supported by a plurality of support member assemblies 100. Each pouch 146 has a front wall 148, a rear wall 150 and a bottom 152 extending therebetween. As shown in FIG. 4, the top of the front wall 148 is attached to one of the support member assemblies 100, and the rear wall 150 is attached to an adjacent support member assembly 100. Although the dunnage 144 shown comprises pouches, the dunnage may assume other shapes or configurations. A pouch 146 is supported by two adjacent support member assemblies 100. As shown in FIG. 3B, the fabric of the pouch 146 is sewn or otherwise secured together along a seam 154 to make a pocket 156 in which is located a tubular support 104 of the support member assembly 100.

Support member assemblies 100 supporting pouches 146 are adapted to move from back to front inside the interior of the container 10, the end members or sliders 102 of the support member assemblies 100 moving along the stationary tracks 86.

Multiple pouches 146 are shown being formed or created from one piece of material draped or laying over and secured to the support member assemblies 100. Alternatively, each pouch 146 may be made from its own piece of material, in which case, the pouches 146 would not be interconnected other than via the straps or space limiters (not shown).

FIGS. 5A-5C and 6A-6E illustrate a method of unloading product 5 from the pouches 146 of the container 10. The method comprises the step of lowering door assembly 66 from a raised and locked position shown in FIG. 5A to a lowered or dropped position illustrated in FIG. 5C. As shown in FIG. 5C, when the door assembly 66 is in a lowered position, an opening having a height $H_1$ is created above the door assembly 66. According to one embodiment, this height $H_1$ is approximately half the height of the interior of the container 10. In order to move the door assembly 66 out of its raised and locked position shown in FIG. 5A, an operator must grasp the upper piece or handle 68 of door assembly 66 and lift the door assembly 66 upwardly so the upper pins 78 move upwardly and outwardly, following the path of the curved upper portion 64 of the upper slots 58 of the guide members 56. As shown in FIG. 5B, once the upper pins 78 of door assembly 66 reach the linear portion 62 of the upper slots 58 of the guide members 56, the door assembly 66 moves further downwardly due in part to gravity, the lower pins 80 traveling along the lower slots 58 of the guide members 56 until the door assembly 66 reaches its open or lowered position shown in FIG. 5C.

Figure 6A:
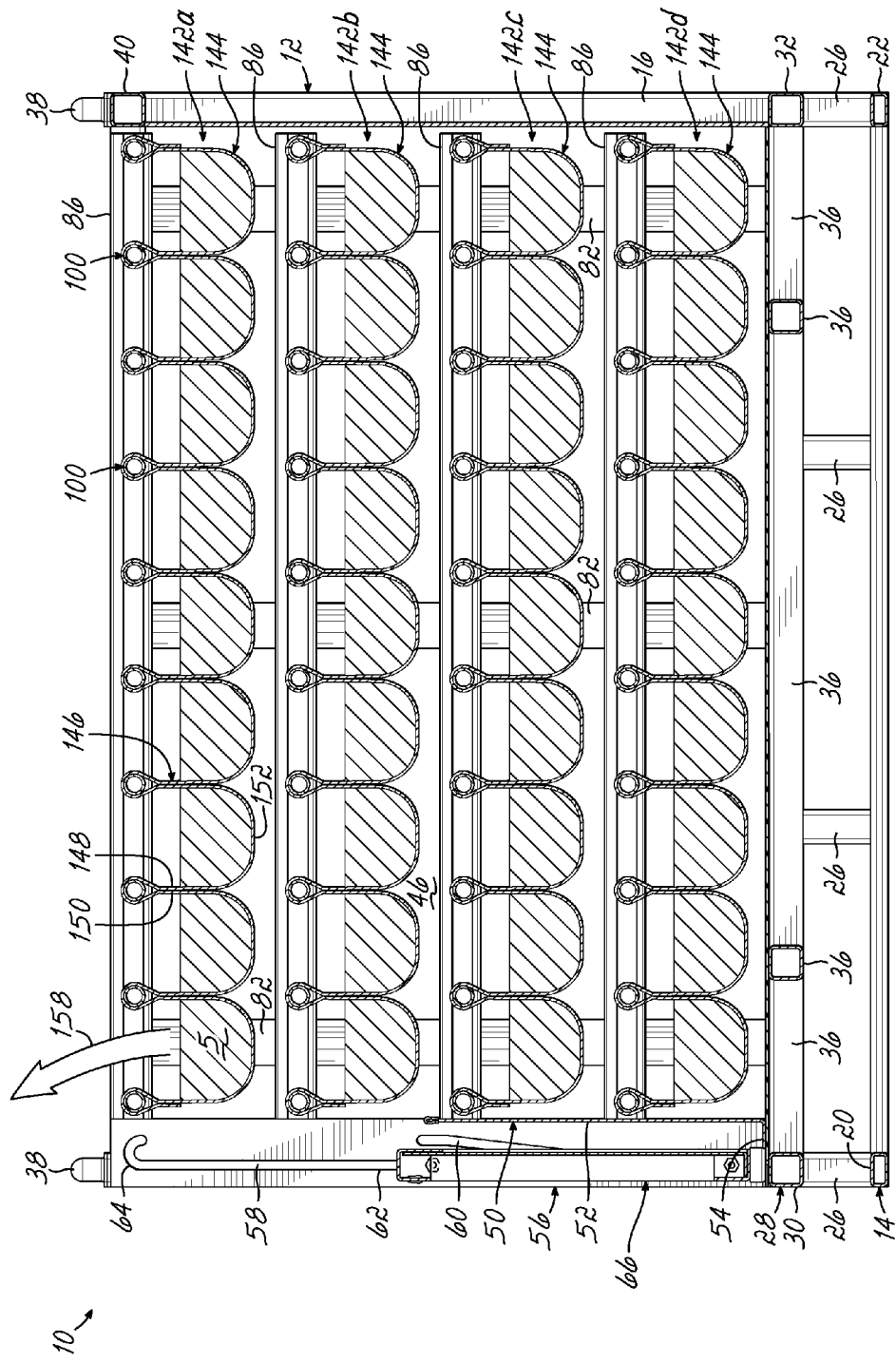
FIG. 6A is a cross-sectional view of the container of FIG. 1, showing the door assembly lowered and the front product of the uppermost layer of products being removed.
Figure 6B:
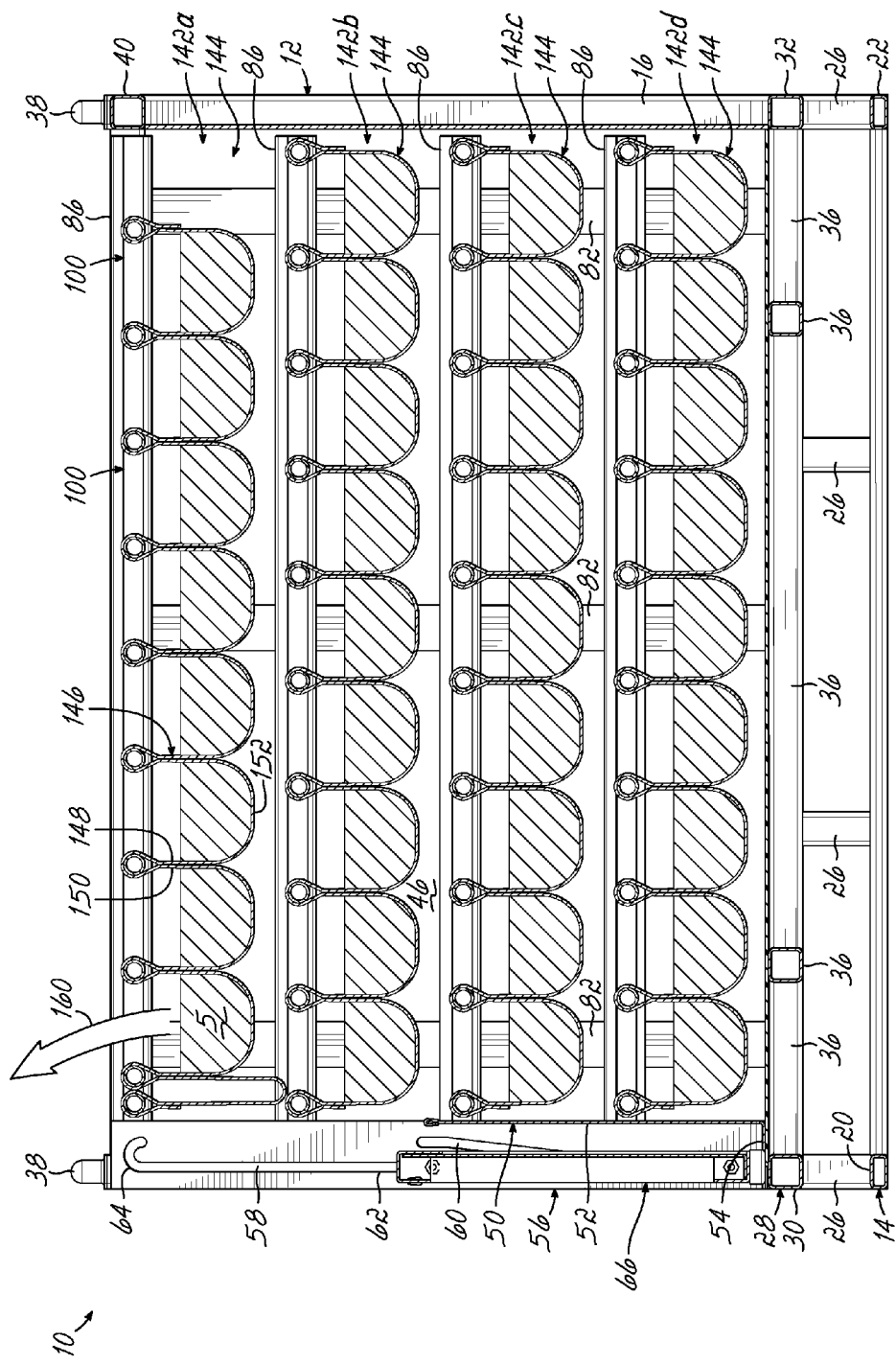
FIG. 6B is a cross-sectional view of the container of FIG. 1, showing the door assembly lowered and the product behind the front product of the uppermost layer of products being removed.

As shown in FIGS. 6A-6E, the next step comprises removing the product 5 closest to the open door assembly 66 out of it dunnage pouch 146 in the uppermost or top level of dunnage 142a in the direction of arrow 158, as shown in FIG. 6A. As shown in FIG. 6B, the next step comprises moving the second from the front support member assembly 100 towards the front of the container, the sliders 102 sliding in the stationary, generally horizontally oriented tracks 86. As shown in FIG. 6B, the entire string of product 5 in pouches 146 of the upper or top level 142A of dunnage moves toward the front of the container. As shown in FIG. 6B, the next step comprises removing another product 5 from the pouch 148 second closest to the open door assembly 66 out of it dunnage pouch 146 of the uppermost or top level of dunnage 142a in the direction of arrow 160. This process is repeated each time a product 5 is removed from the upper or top level of dunnage, the support member assemblies 86 are pulled forwardly with the pouches 146 still containing product 5, the sliders 102 sliding in the stationary, generally horizontally oriented tracks 86, as shown in FIG. 6B.

Figure 6C:
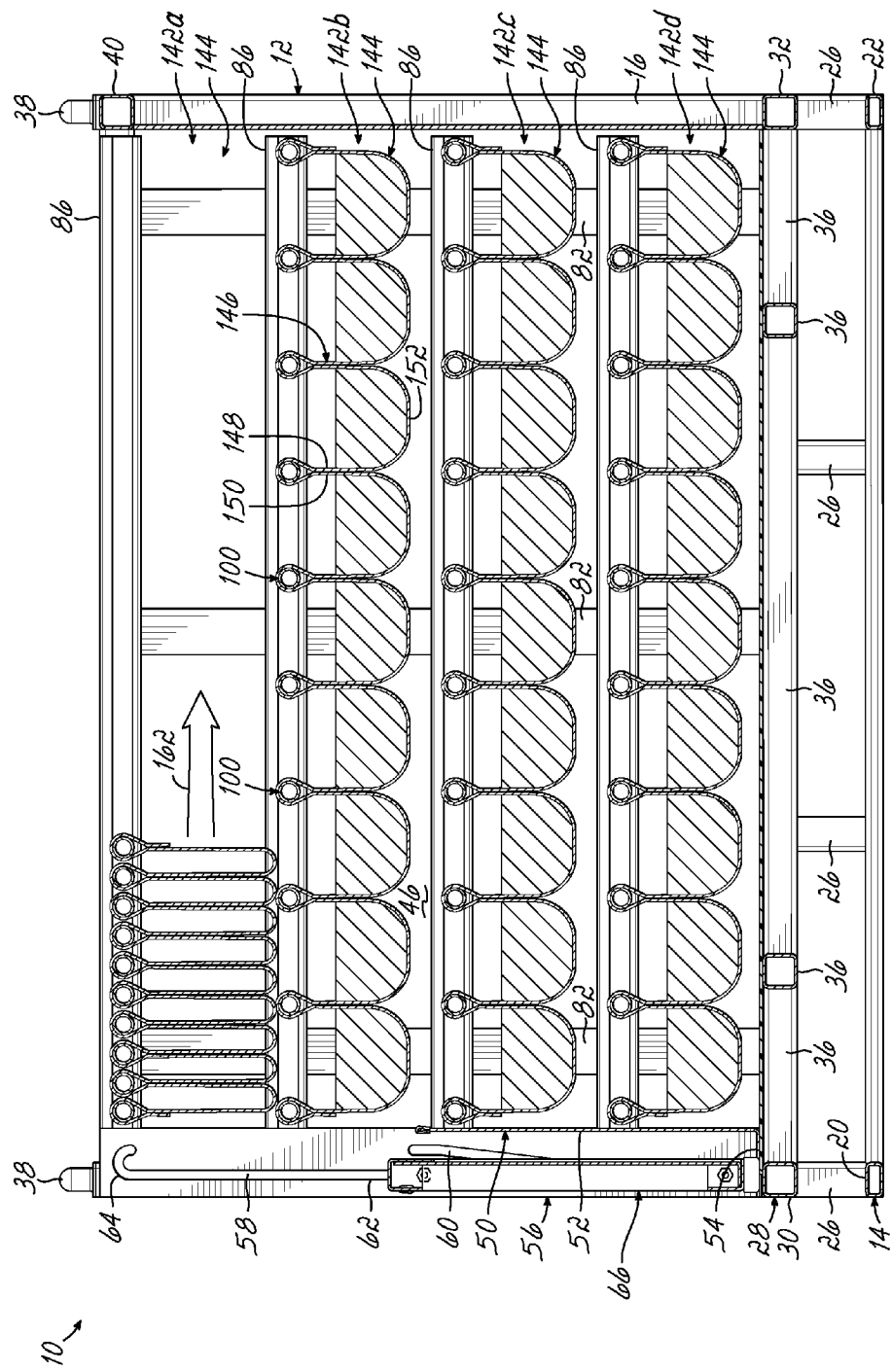
FIG. 6C is a cross-sectional view of the container of FIG. 1, showing the door assembly lowered and the uppermost layer of dunnage being emptied and moved rearwardly.

As shown in FIG. 6C, once all of the product 5 in the pouches 146 of the top level of dunnage 142a have been removed, the operator moves the empty dunnage or pouches 146 of the top level of dunnage 142a rearwardly in the direction shown by arrow 162. As shown in FIGS. 6A and 6B, the lowered position of the door assembly 66 makes it easier from an ergonomic standpoint for the operator to remove the product 5 because the operator may get closer to the product 5 in order to remove them from inside the container.

Figure 6D:
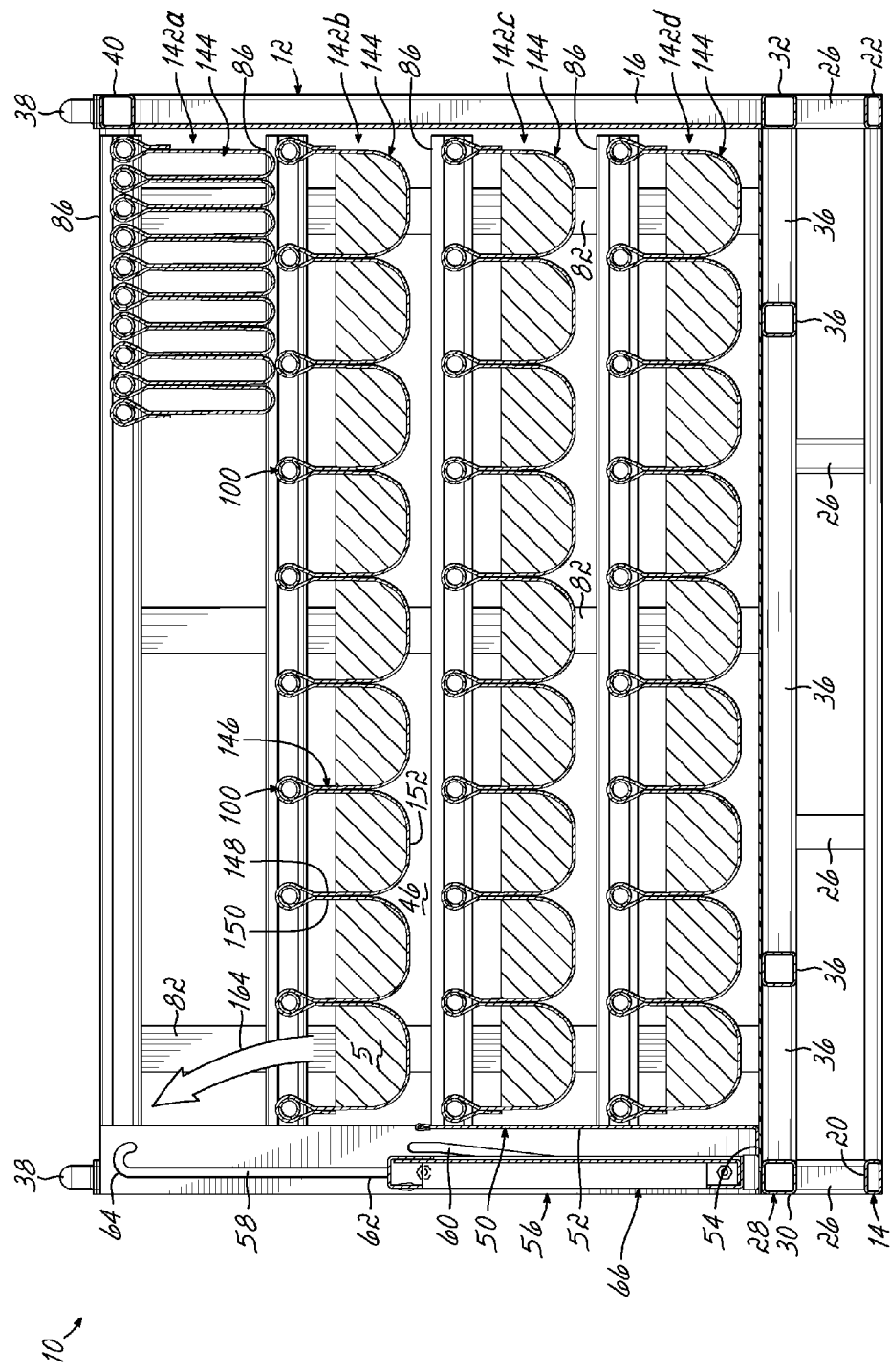
FIG. 6D is a cross-sectional view of the container of FIG. 1, showing the door assembly lowered and the front product of the second uppermost layer of dunnage being emptied.

As shown in FIG. 6D, this process of unloading product 5 is continued by an operator one level at a time moving downwardly. FIG. 6D shows a product 5 being removed from a front pouch 146 of the second lowest level of dunnage 142b in the direction of arrow 164. When all of the product 5 of level 142b is removed, the operator pushes the emptied pouches of level 142b rearwardly, like he/she did with the upper level of emptied dunnage/pouches and then removes the products of level 142c. This process is repeated one layer or level at a time, each time all the product 5 are removed from the pouches 146 of a level, and each of the support member assemblies 100 are pushed rearwardly to a rear portion of the container, creating open space for the operator to remove product from the next lowest level.

Figure 6E:
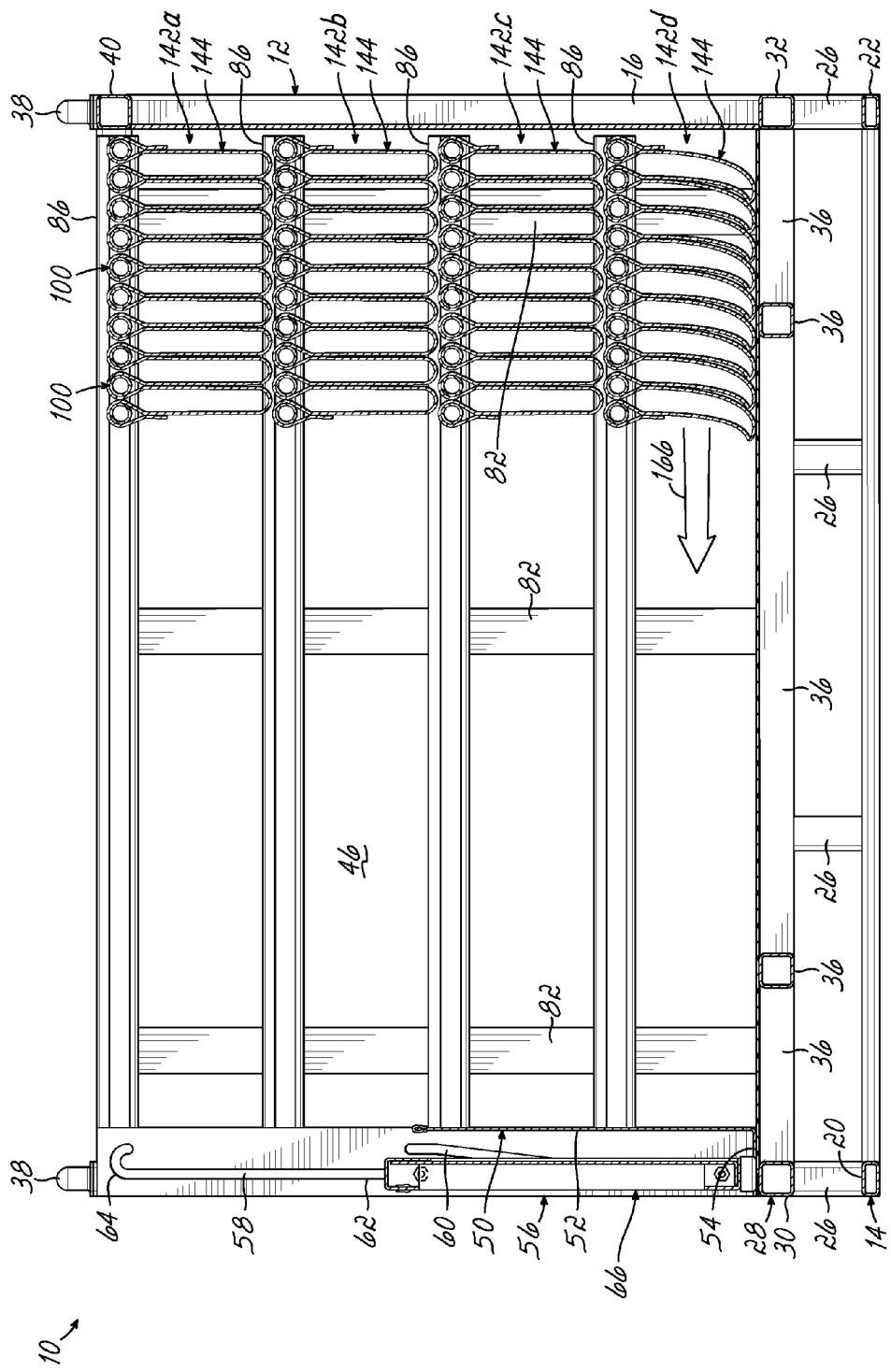
FIG. 6E is a cross-sectional view of the container of FIG. 1, showing the door assembly lowered and all the layers of dunnage emptied.

FIG. 6E illustrates the empty container 10 still having the dunnage 144 therein, which may then be shipped back to its original location or any desired location for loading the empty dunnage 144 with product. During the unloading and loading processes, the tracks 86 remain stationary fixedly secured to the container 10. The support member assemblies 100 and dunnage 144 hanging from the support member assemblies 100 move inside the container with the assistance of an operator. The loading process is the reverse.

Figure 6F:
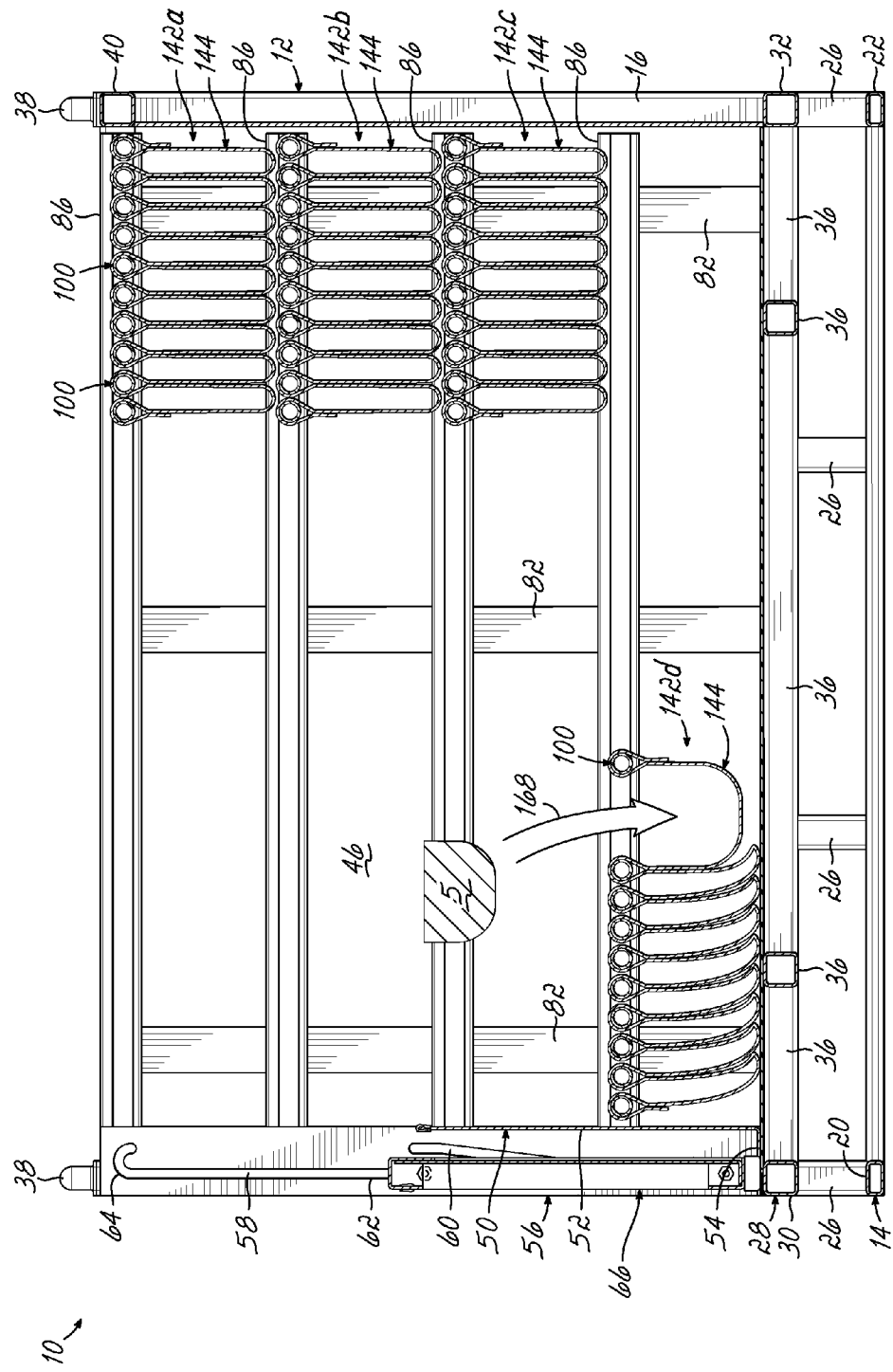
FIG. 6F is a cross-sectional view of the container of FIG. 1, showing the door assembly lowered and a first product being loaded into the lowest layer of dunnage.
Figure 6G:
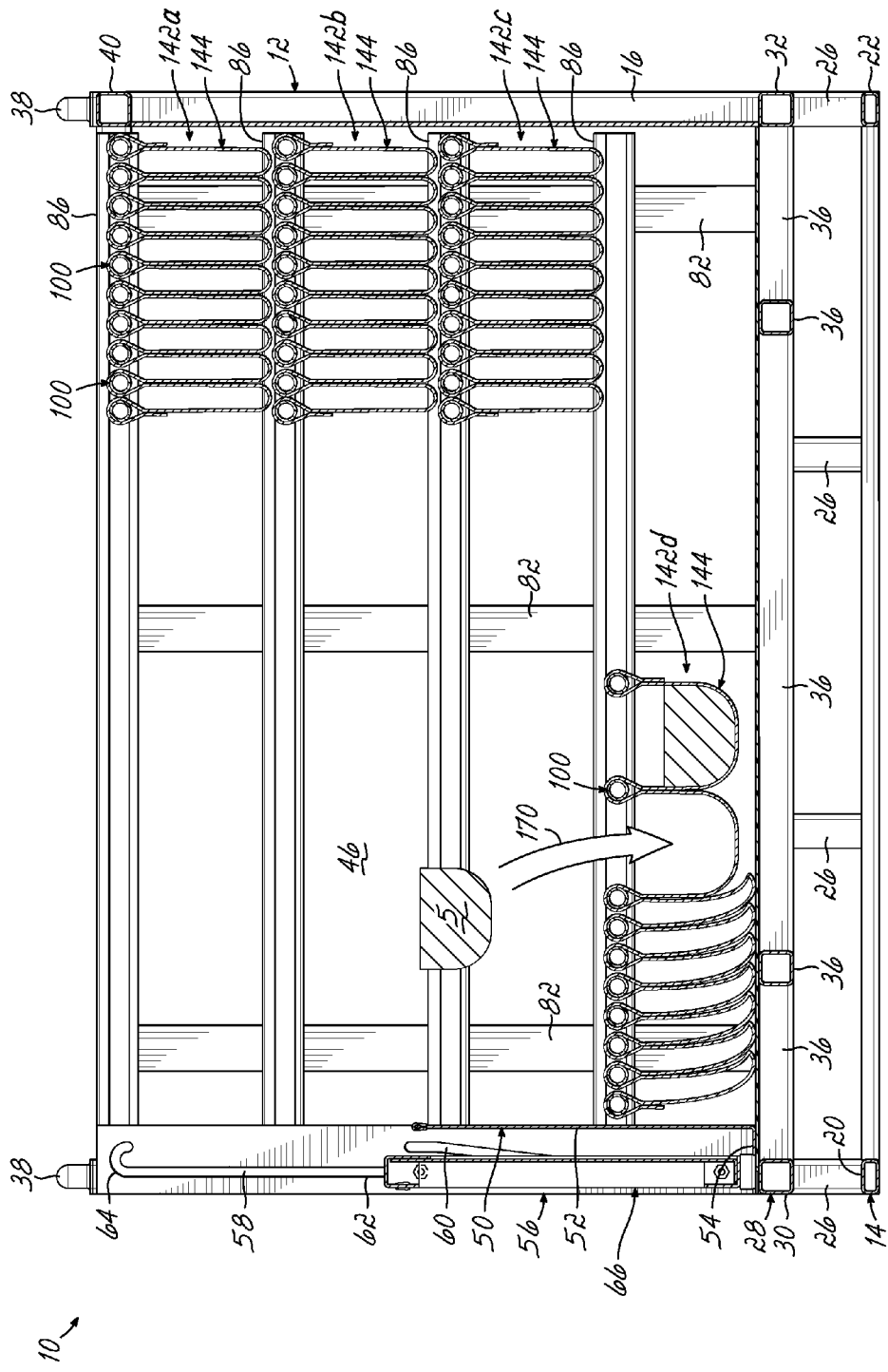
FIG. 6G is a cross-sectional view of the container of FIG. 1, showing the door assembly lowered and a second product being loaded into the lowest layer of dunnage.

FIGS. 6E-6I illustrates a method of loading product 5 into the pouches 146 of emptied container 10. As shown in FIG. 6E, with door assembly 66 in its lowered or dropped position, the first step of the loading process, after lowering the door assembly 66, comprises moving the lowermost or bottom level of dunnage 142d in the direction of arrow 166, from back to front. As shown in FIG. 6F, with the bottom level of dunnage 142d in a forward position, a product 5 is loaded into a dunnage pouch 146 furthest away from the open door assembly 66 in the direction of arrow 168. As shown in FIG. 6G, the next step comprises moving one or more of the support member assemblies 100, including the single loaded pouch 146 of the bottom level 142d towards the rear of the container, the sliders 102 sliding in the tracks 86, the loaded rearwardmost pouch 146 containing a product 5. This process of loading one pouch 146 at a time of the bottom level 142d continues until each pouch 146 of the bottom level 142d is full.

Figure 6H:
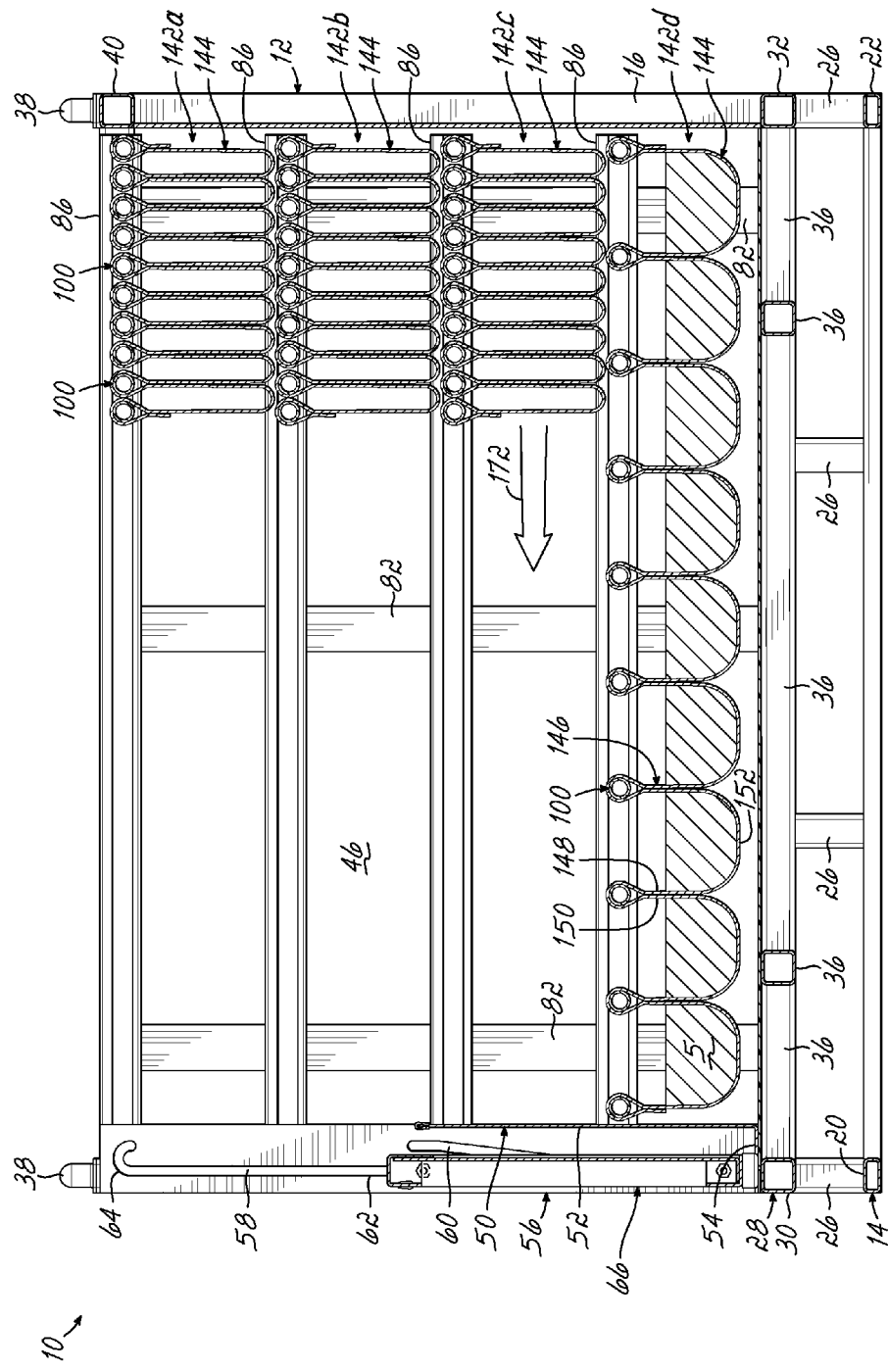
FIG. 6H is a cross-sectional view of the container of FIG. 1, showing the door assembly lowered and the lowest layer of dunnage being fully loaded with product.
Figure 61:
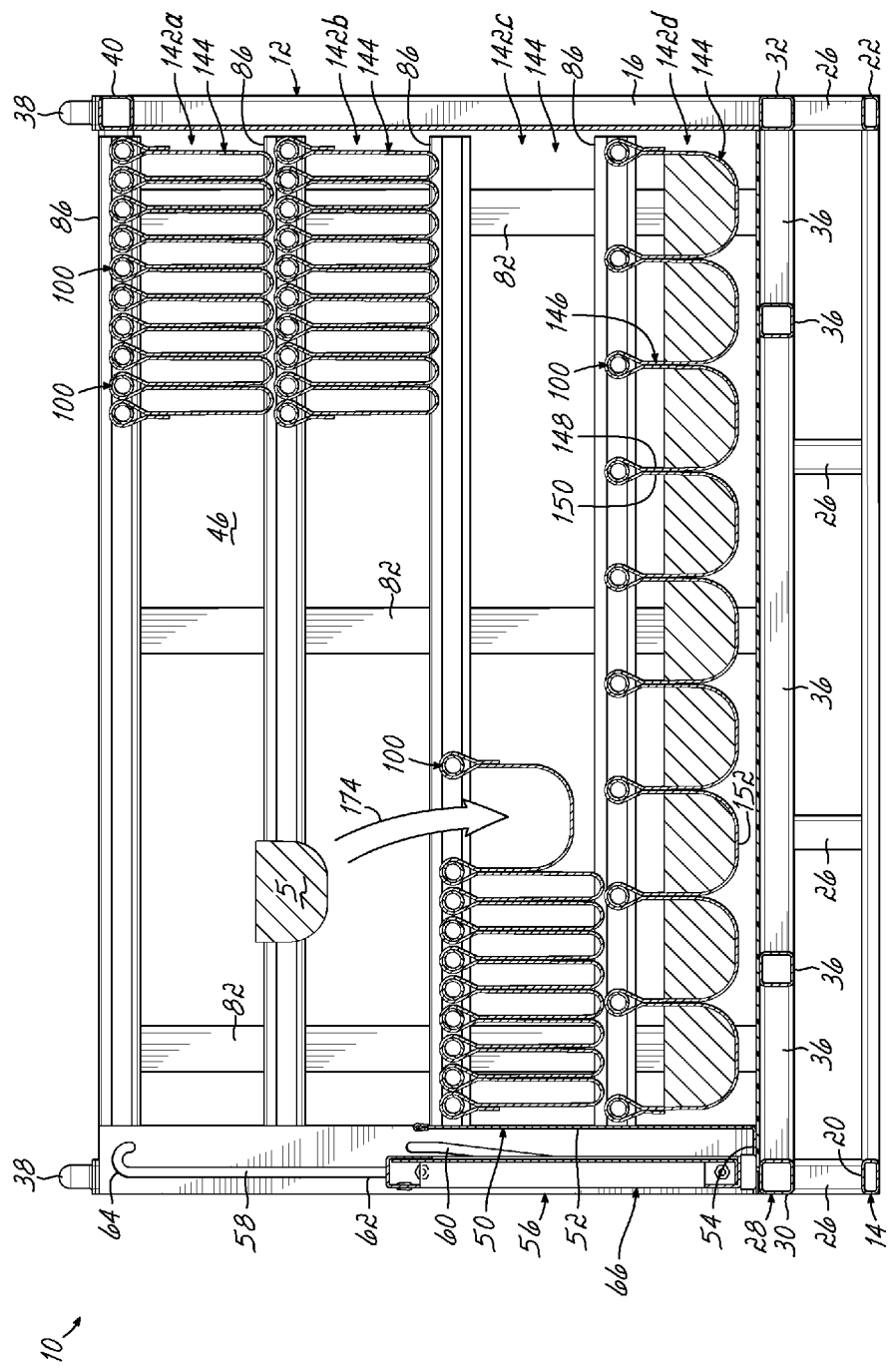
Figure 7:
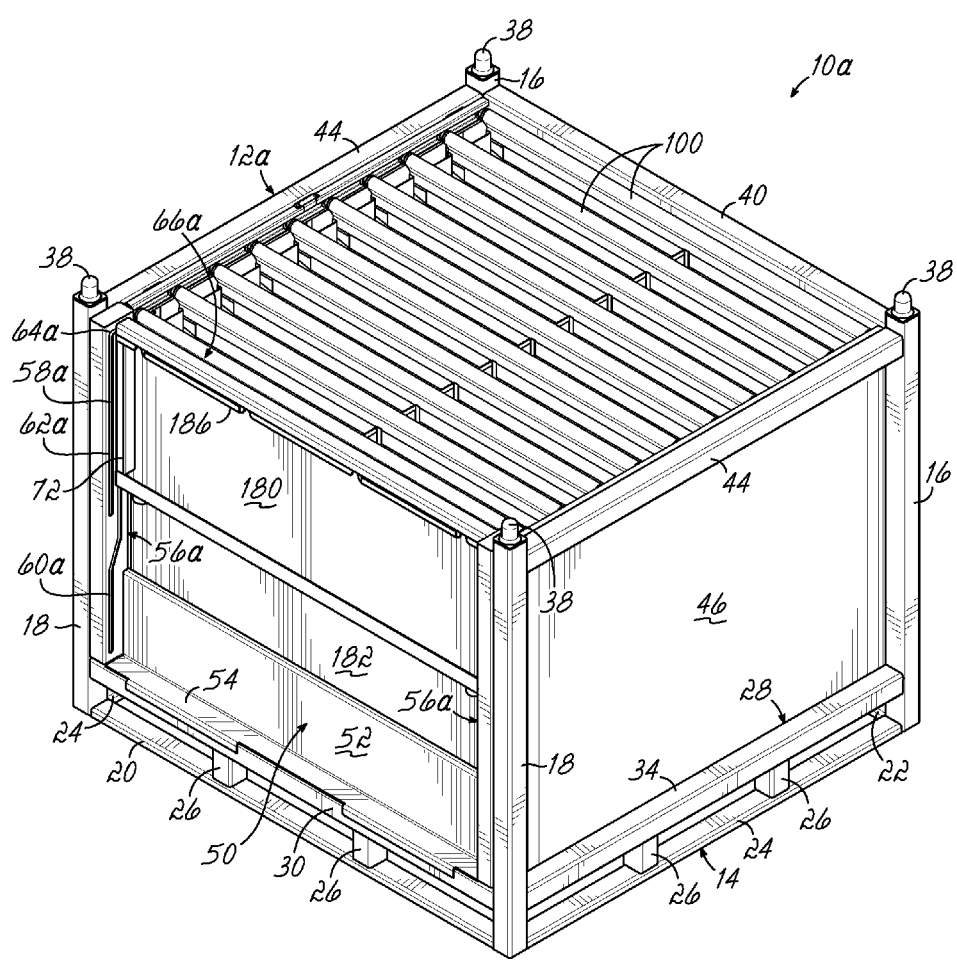
FIG. 7 is a perspective view of another embodiment of a reusable and returnable container.

As shown in FIG. 6H, after the bottom level 142d of dunnage is full, the empty pouches 146 of the level 142c (third from the top) of dunnage is moved or pulled toward the front of the container in the direction of arrow 172. As shown in FIG. 6I, the next step comprises inserting another product 5 into the last dunnage pouch 146 (furthest from the open door assembly 66) of the level of dunnage 142c in the direction of arrow 174. This process is repeated each time a product 5 is inserted into a dunnage pouch 146 of the level of dunnage 142c, the support member assemblies 86 are pushed rearwardly with the pouches 146 containing product 5, the sliders 102 sliding in the tracks 86. Once all of the pouches 146 of the level of dunnage 142c have been loaded with product 5, the operator loads the next highest level of dunnage pouches 146 with product 5.

This process of loading product 5 is continued by an operator one level at a time, moving upwardly until the container is full of product 5.

The method lastly comprises the step of raising door assembly 66 from its lowered or dropped position illustrated in FIGS. 6A-6I to its raised and locked position shown in FIG. 4. In order to move the door assembly 66 from its lowered or dropped position shown in FIGS. 6A-6I, an operator must grasp the upper piece or handle 68 of door assembly 66 and lift the door assembly 66 upwardly, the upper and lower pins 78, 80, respectively, moving upwardly, following the paths of the upper and lower slots 58, 60 of the guide members 56. As shown in FIG. 5B, once the upper pins 78 of door assembly 66 pass through the curved upper portion 64 of the upper slots 58 of the guide members 56, the door assembly 66 reaches its raised and locked position shown in FIG. 4.

Although one specific shape of product 5 is illustrated in the drawings, this document is not intended to limit in any way the size, shape or configuration of product 5 shipped or stored in any of the embodiments described or shown herein.

FIGS. 7, 8A, 8B and 8C illustrate an alternative embodiment of container 10a. Container 10a is identical to container 10 except for the door assembly, including the guide members. The door assembly 66a of container 10a has two movable pieces, while the door assembly 66 of container 10 has only one movable piece. The loading and unloading processes described herein are identical in both containers, with the exception of how the door assembly is moved.

Figure 8A:
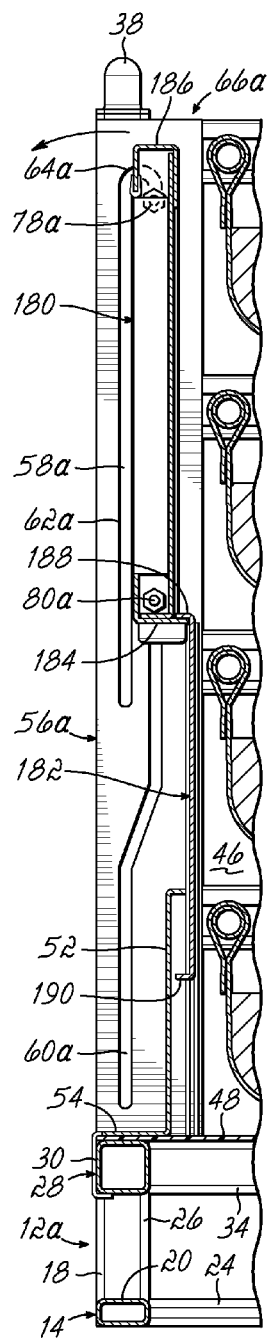
FIG. 8A is a cross-sectional view of a portion of the container of FIG. 7, showing the door assembly being lowered.
Figure 8B:
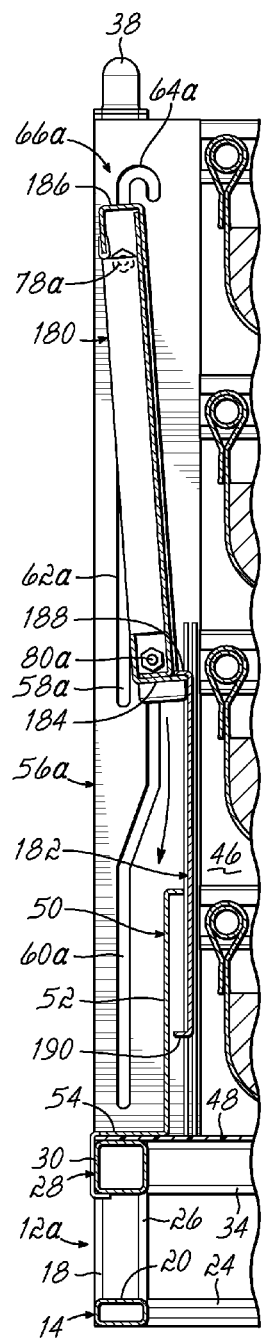
FIG. 8B is a cross-sectional view of a portion of the container shown in FIG. 7, showing the door assembly being lowered further.
Figure 8C:
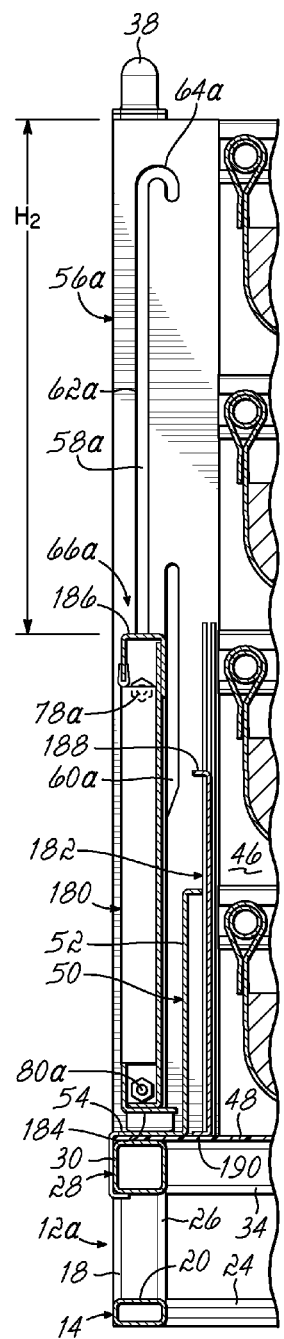
FIG. 8C is a cross-sectional view of a portion of the container shown in FIG. 7, showing the door assembly being in a lowered position.

Each of the guide members 56a of the frame 12a is generally rectangular in cross-section and has a hollow interior. Each of the guide members 56a of the frame 12a has two slots therethrough; an upper slot 58a and a lower slot 60a. As best shown in FIGS. 8A, 8B and 8C, upper slot 58a has a "candy cane" shape comprising a straight portion 62a and a curved upper portion 64a. The lower slot 60a is not linear, but rather has a "Z" shape, as best illustrated in FIG. 8A. These upper and lower slots 58a, 60a are used to secure a movable multi-segmented or multi-piece door, or door assembly 66a, in a fixed position, and guide the door assembly 66a during its movement from an upper or raised position and a lower or dropped position.

As best shown in FIGS. 7 and 8A-8C, the movable door assembly 66a comprises a movable upper segment 180 and a movable lower segment 182, which are not connected together. As best shown in FIG. 8C, the upper segment 180 has a flange 184 at the bottom thereof. The upper segment 180 has a pair of upper pins 78a extending outwardly from the upper segment 120 of the door assembly 66a and adapted to ride or move inside the upper slots 58a. In addition, the upper segment 180 of the door assembly 66a has an integral U-shaped upper handle 186 which a user may easily grasp and move the upper segment 180 of the door assembly 66a, along with the lower segment 182 of the door assembly 66a, due to the configuration of the door assembly 66a. Similarly, the upper segment 180 of door assembly 66a has a pair of lower pins 80a extending outwardly from the upper segment 180 of door assembly 66a and adapted to ride or move inside the lower slots 60a. FIG. 8A shows the door assembly 66a locked in a raised position with the upper pins 78a located at the outer ends of the curved upper portions 64a of the upper slots 58a.

The lower segment 182 of door assembly 66a is not fastened or secured to any particular piece and is free floating between the stationary shield 50 and the upper segment 180 of door assembly 66a. As best shown in FIG. 8C, the lower segment 182 of door assembly 66a is generally C-shaped, having an upper flange 188 located at the upper end of the lower segment 182 and a lower flange 190 located at the lower end of the lower segment 182. The lower segment 182 of door assembly 66a moves inside the stationary main portion 52 of the shield 50. As the door assembly 66a is lowered, the lower segment 182 of door assembly 66a moves inside the main portion 52 of the shield 50. As the door assembly 66a is raised, the flange 184 of the upper segment 180 of door assembly 66a contacts the upper flange 188 located at the upper end of the lower segment 182 and raises the floating lower segment 182 of door assembly 66a.

When the door assembly 66a is in its lowered position shown in FIG. 8C, an opening having a height $H_2$ is created above the door assembly 66a. The height $H_2$ of the opening is greater than the height $H_1$ of the embodiment shown in FIGS. 5A-5C (approximately half the height of the container). Thus, the opening $H_2$ is greater than half the height of the container $H_1$, making it more desirable from an ergonomic standpoint for the loader/unloader.

Figure 9:
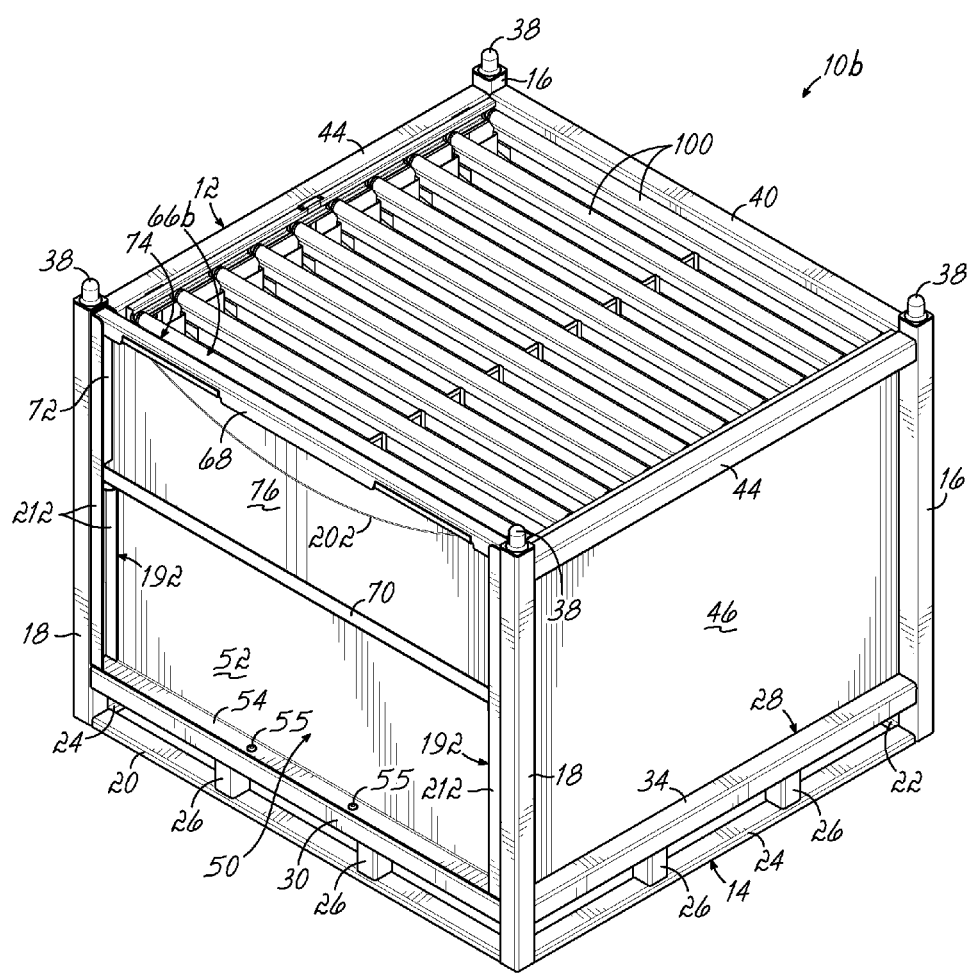
FIG. 9 is a perspective view of another embodiment of a reusable and returnable container.
Figure 10:
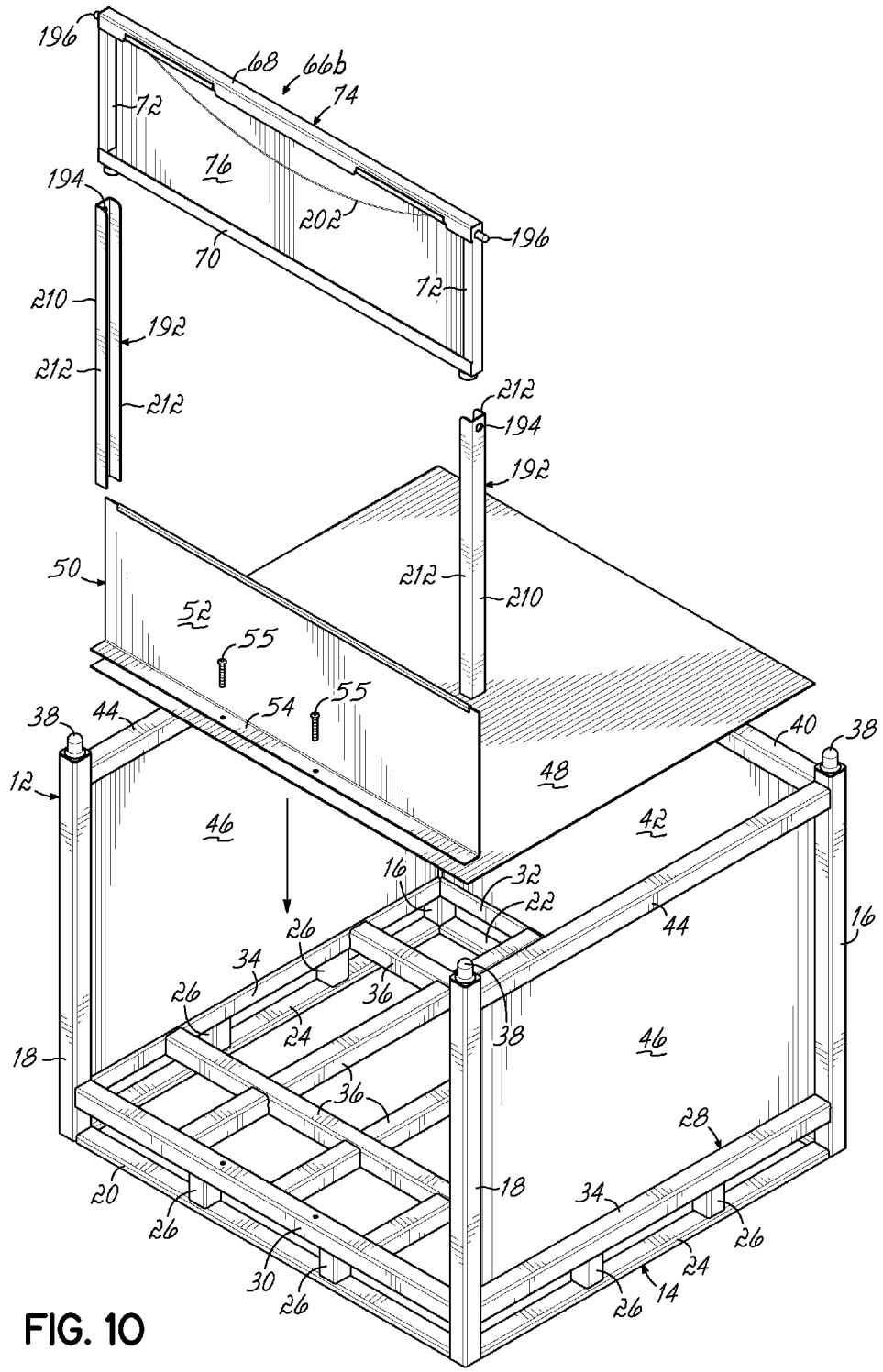
FIG. 10 is a partially disassembled view of a portion of the container of FIG. 9.
Figure 11A:
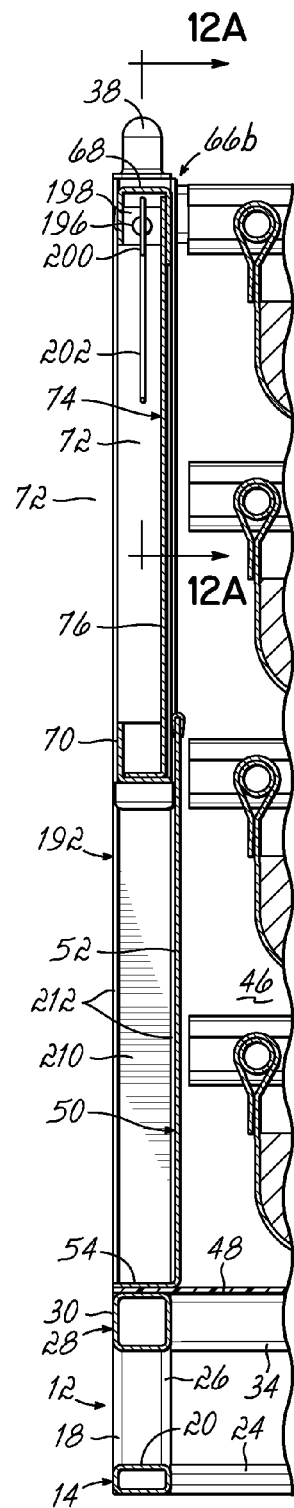
FIG. 11A is a cross-sectional view of a portion of the container of FIG. 9, showing the door assembly being locked in a raised position.
Figure 11B:
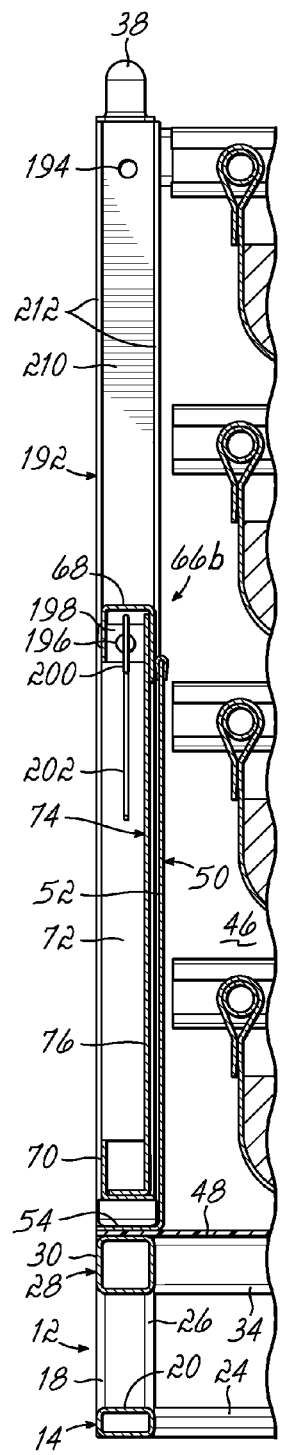
FIG. 11B is a cross-sectional view of a portion of the container shown in FIG. 9, showing the door assembly being in a dropped position.

FIGS. 9-12B illustrate an alternative embodiment of container 10b. Container 10b is identical to container 10, except for the door assembly and guide members. In container 10b, the slotted guide members 56 of container 10 are omitted and replaced with two unslotted guide members 192. As shown in FIG. 10, each guide member 192 is generally U-shaped in cross-section having an outer wall 210 and two side walls 212. As shown in FIGS. 9 and 10, each of the guide members 192 is secured to an inside surface of one of the front corner posts 18 via welding or fasteners and extends from an upper surface of front member 30 of sub-base 28 to the top of one of the front corner posts 18 (excluding knobs 38).

Figure 12A:
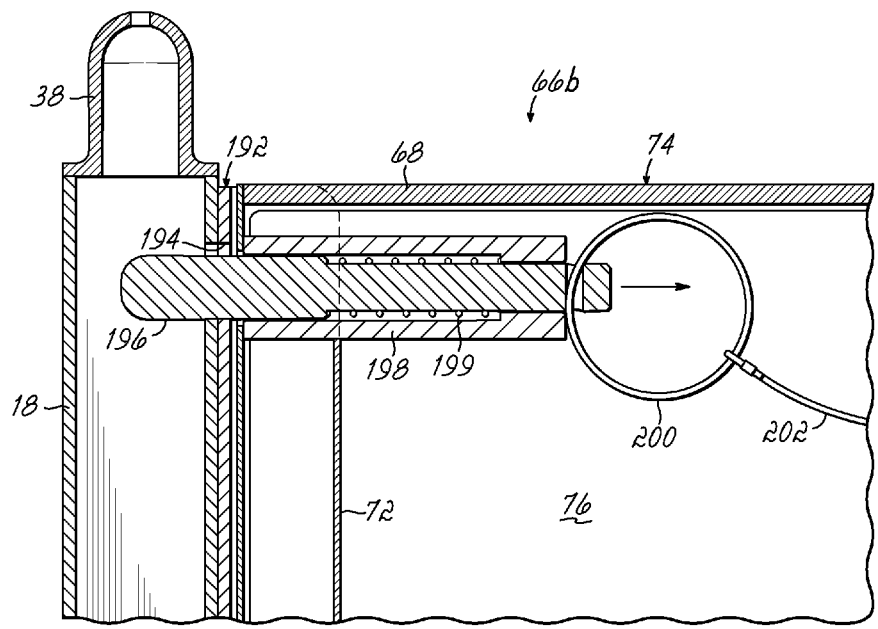
FIG. 12A is a cross-sectional view taken along the line 12A-12A of FIG. 11A.
Figure 12B:
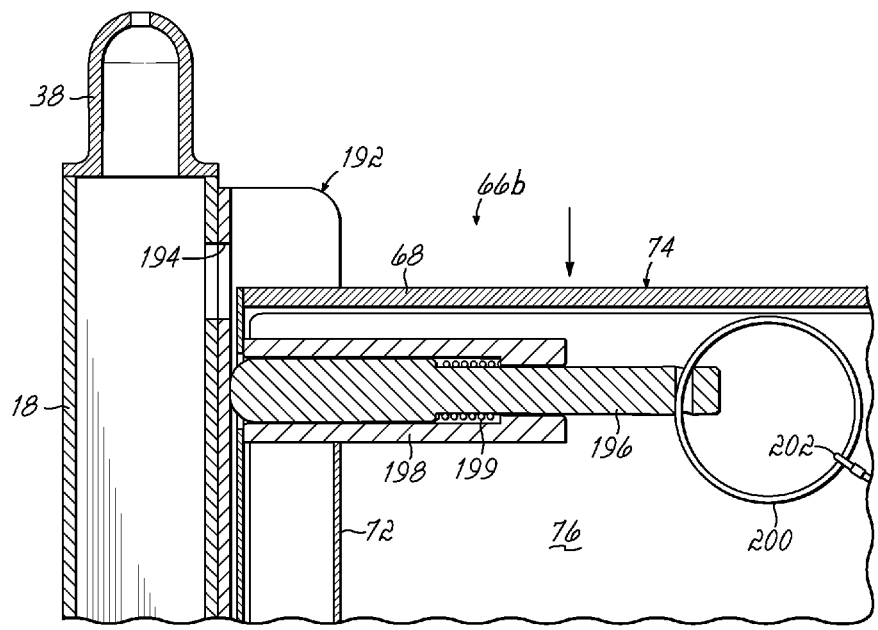
FIG. 12B is a cross-sectional view like FIG. 12A showing one of the pins in a contracted position inside one of the guide members.
Figure 13:
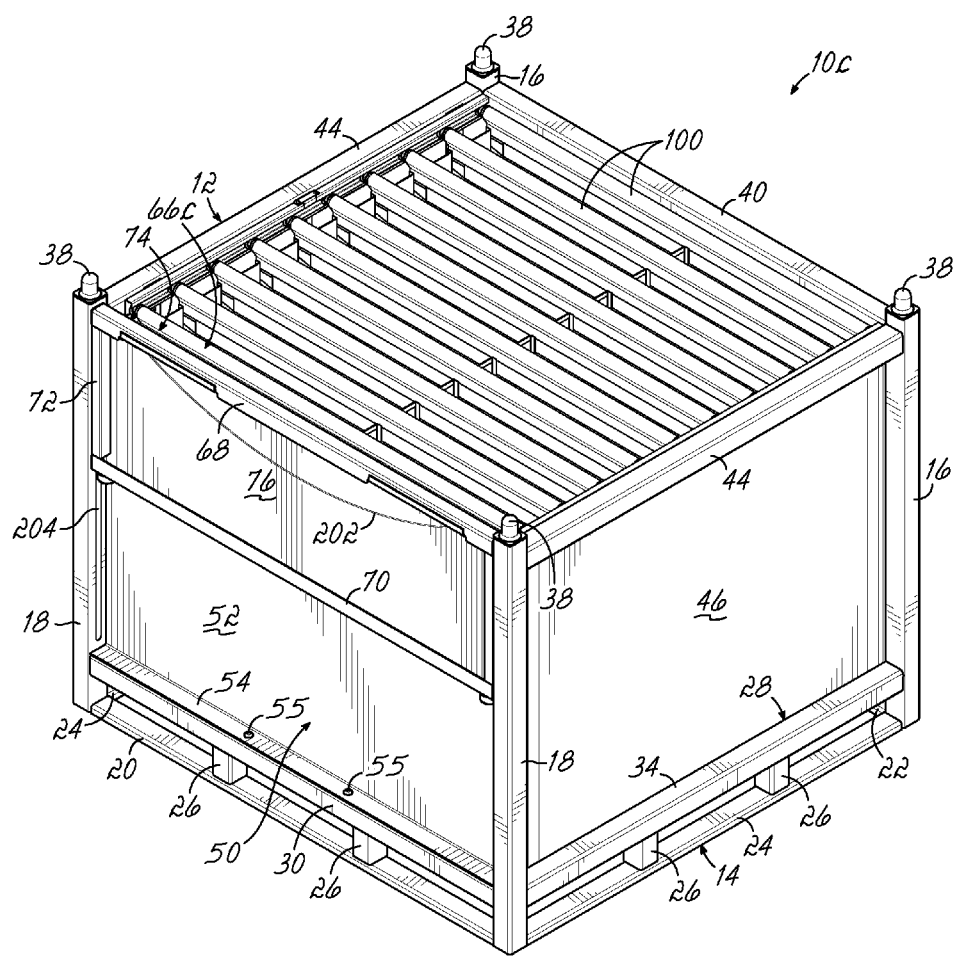
FIG. 13 is a perspective view of another embodiment of a reusable and returnable container.

The movable door assembly 66b of container 10b has only one movable segment, like the movable door assembly 66 of container 10. The loading and unloading processes described herein are identical in both containers, with the exception of how the door assembly is moved. In container 10b, door assembly 66b slides in stationary generally vertically oriented guide members 192 (one on each side) between a raised and locked position shown in FIGS. 11A and 12A, and a lowered or dropped position shown in FIGS. 11B and 12B. As shown in FIG. 10, at the top of each guide member 192 is an opening 194 adapted to receive a movable pin 196. Each pin 196 is movable inside a housing 198. The door assembly 66b has two pin housings 198 (only one being shown in FIG. 12A and FIG. 12B), each housing 198 being secured to one of the side pieces 72 of door assembly 66b. As shown in FIG. 12A, inside each housing 198, a spring 199 biases the pin 196 outwardly in an extended position. FIG. 12B shows the pin 196 in a contracted position inside one of the guide members 192. A ring 200 is attached to pin 196 at each end of the door assembly 66b. The housings 198 (only one housing is shown) are located at the sides of the door assembly 66b and move with the door assembly 66b. A connector 202, which may be in the form of a wire or any other suitable material extends between the rings 200. In order to disengage the pins 196 from inside the holes 194 and lower the door assembly 66b, an operator may pull on the connector 202, thereby moving the pins 196 toward each other out of engagement with the holes 194. With the pins 196 no longer holding the door assembly 66b in an upward raised and locked position, the door assembly 66b may be moved downwardly inside guide members 192 to the position shown in FIG. 11B. As the door assembly 66b is lowered, it moves outside the shield 50. See FIG. 11B.

Although FIGS. 9-12B illustrate container 10b having only one door assembly 66b, a door assembly may be located on opposite sides of a container. In such a container, two guide members would be located inside the container, one for each movable door assembly.

Figure 15A:
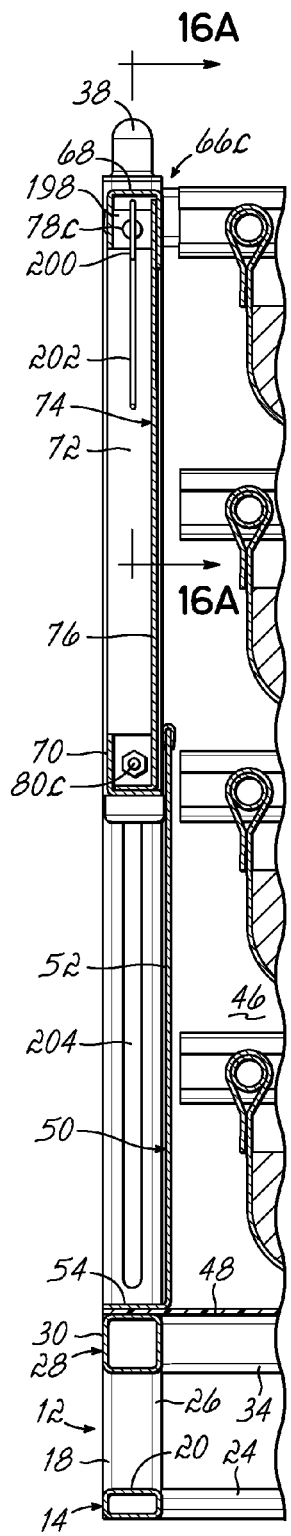
FIG. 15A is a cross-sectional view of a portion of the container of FIG. 13, showing the door assembly being locked in a raised position.
Figure 15B:
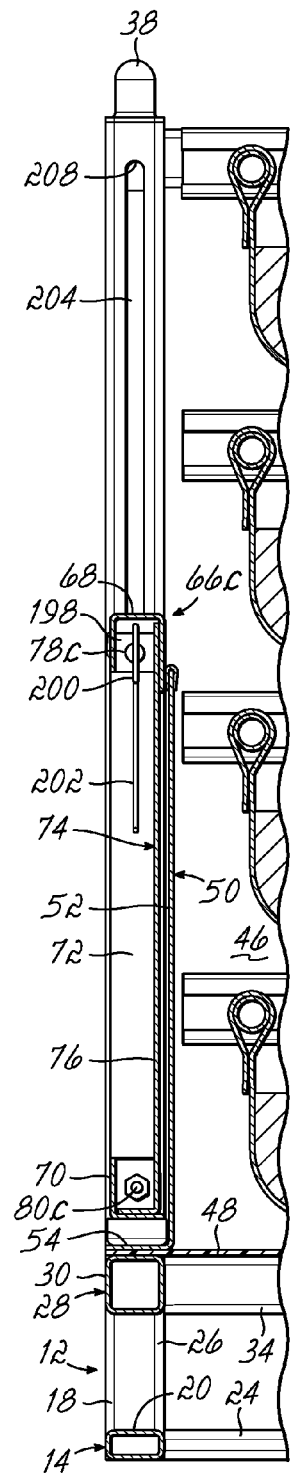
FIG. 15B is a cross-sectional view of a portion of the container shown in FIG. 13, showing the door assembly being in a dropped position.
Figure 16A:
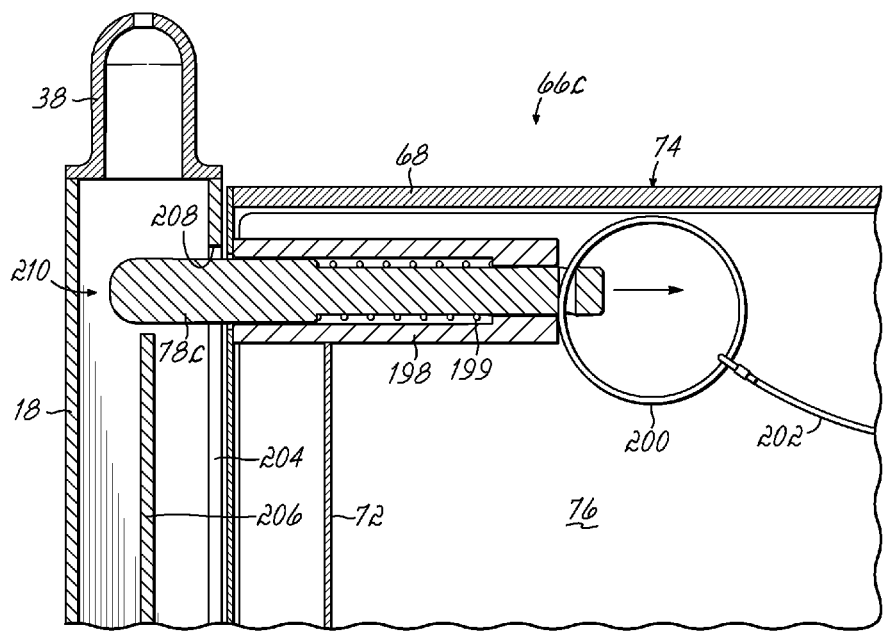
FIG. 16A is a cross-sectional view taken along the line 16A-16A of FIG. 15A.
Figure 16B:
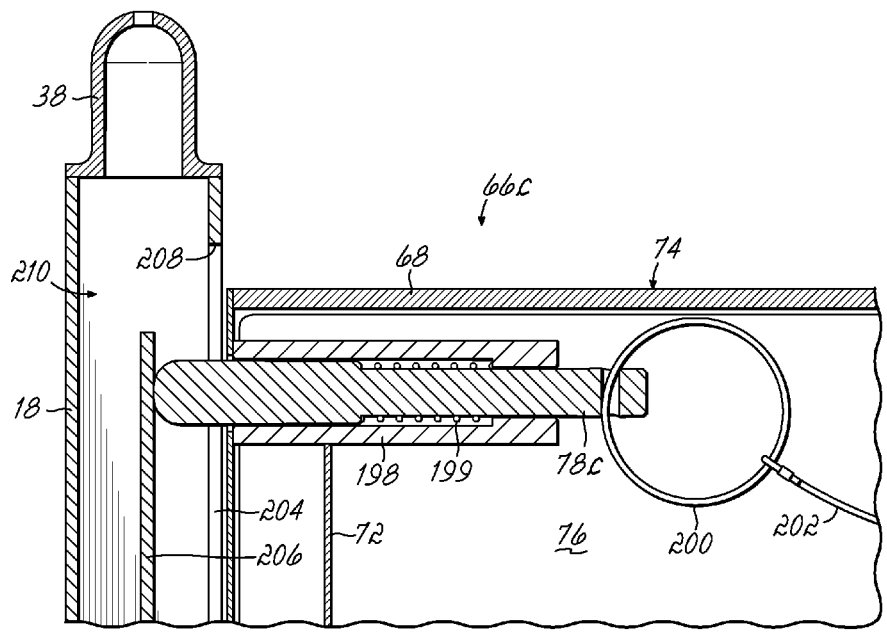
FIG. 16B is a cross-sectional view like FIG. 16A showing one of the pins in a contracted position inside one of the dividers of one of the front corner posts.

FIGS. 13-16B illustrate an alternative embodiment of container 10c. Container 10c is identical to container 10, except for the door assembly and guide members. In container 10c, the slotted guide members 56 of container 10 are omitted. Instead, each of the front corner posts 18 has a straight or linear slot 204 along an inside surface of the front corner post 18. As best shown in FIGS. 16A and 16B, a generally vertically oriented divider 206 is located inside each of the front corner posts 18, and each slot 204 has an upper edge 208.

The movable door assembly 66c of container 10c has only one movable segment, like the movable door assembly 66 of container 10. The loading and unloading processes described herein are identical in both containers, with the exception of how the door assembly is moved.

Figure 14:
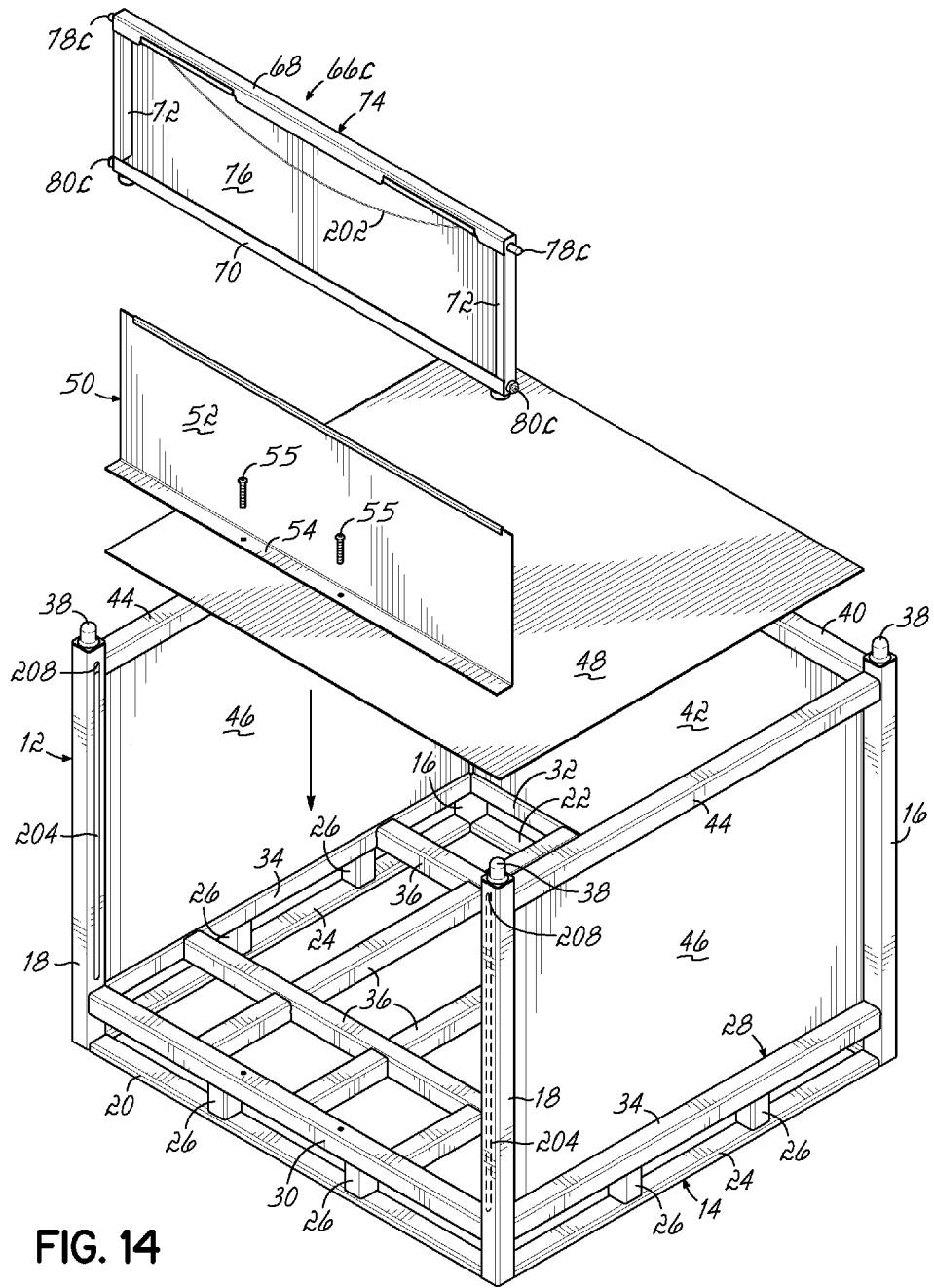
FIG. 14 is a partially disassembled view of a portion of the container of FIG. 13.

As seen in FIG. 14, upper and lower pins 78c, 80c of movable door assembly 66c slide in generally vertically oriented slots 204 between a raised and locked position shown in FIGS. 15A and 16A, and a lowered or dropped position shown in FIGS. 15B and 15B. As shown in FIG. 16A, the divider 206 inside each front corner post 18 does not extend all the way to the top of each slot 204, thereby creating an opening 210 above divider 206. The opening 210 is adapted to receive a movable pin 78c movable inside a housing 198. The door assembly 66c has two pin housings 198 (only one being shown in FIGS. 16A and 16B), each housing 198 being secured to one of the side pieces 72 of door assembly 66c. As shown in FIG. 16A, inside each housing 198, a spring 199 biases a pin 78c outwardly in an extended position. FIG. 16B shows pin 78c in a contracted position, the spring 199 biasing the pin 78c against one of the dividers 206. Due to the engagement of the pins 78c (only one being shown) with the dividers 206 of the front corner posts 18 (only one being shown), the door assembly 66c does not free fall downwardly upon the pins 78c being moved towards each other due to connector 202 being pulled. Rather, the movable door assembly 66c may be moved downwardly in a controlled matter and held temporary at any desired position. A ring 200 is attached to pin 78c at each end of the door assembly 66c. The housings 198 (only one housing is shown) are located at the sides of the door assembly 66c and move with the door assembly 66c. A connector 202, which may be in the form of a wire or any other suitable material, is connected to each ring 200 and extends between the rings 200.

In order to disengage the pins 78c from the openings 210 and lower the door assembly 66c, an operator may pull on the connector 202, thereby moving the pins 78c toward each other out of engagement with the openings 210. With the pins 78c no longer holding the door assembly 66c in an upward raised and locked position above the dividers 206, the door assembly 66c may be moved downwardly, the pins 78c, 80c moving along slots 204 to the position shown in FIG. 16B. As the door assembly 66c is lowered, it moves outside the shield 50. See FIG. 15B.

Although FIGS. 13-16B illustrate container 10c having only one door assembly 66c, a door assembly may be located on opposite sides of a container. In such a container, two guide members would be located inside the container, one for each movable door assembly.

While various embodiments of the present invention have been illustrated and described in considerable detail, it is not the intention of the applicant to restrict or in any way limit the scope of the claims to such detail. Additional advantages and modifications will readily appear to those skilled in the art. The invention in its broader aspect is, therefore, not limited to the specific details, representative system, apparatus, and method, and illustrative example shown and described. Accordingly, departures may be made from such details without departing from the spirit or scope of the applicant's general inventive concept.

What is claimed is:

1. A container for holding product therein during shipment, the container comprising:
   a frame having a base and two front corner posts;
   a plurality of tracks supported by opposed sides of the frame at multiple spaced levels;
   a plurality of movable support member assemblies extending between opposed tracks of each level;
   dunnage supported by the support member assemblies;
   a guide member secured to each front corner post, each guide member having multiple slots;
   a door assembly movable between a raised and locked position and a lowered position, the door assembly having upper and lower pins on each side adapted to move in the slots of the guide members to guide the door assembly during movement, an upper slot of each guide member having a curved portion, upper pins of the door assembly being located at outer ends of the curved portions when the door assembly is in its raised and locked position.

2. The container of claim 1 wherein the dunnage comprises pouches.

3. The container of claim 1 wherein each of the guide members has two slots.

4. The container of claim 1 wherein the frame is made of metal.

5. The container of claim 1 further comprising a sub-base spaced above the base with stubs.

6. The container of claim 1 wherein at least one slot of each guide member has a curved portion and a linear portion.

7. The container of claim 1 wherein each of the guide members has a pair of slots and the movable door assembly has a pin adapted to move in each slot.

8. The container of claim 1 wherein the container has at least two levels.

9. A container for holding product therein during shipment, the container comprising:
   a frame having a bottom and opposed sides;
   a plurality of tracks supported by opposed sides of the frame at spaced levels;
   a plurality of movable support member assemblies extending between opposed tracks of each level, each of the support member assemblies comprising a pair of end members movable along the tracks and a support extending between the end members;
   pouches supported by the support member assemblies;
   a door assembly movable between a raised position and a lowered position, the door assembly having multiple pins on each side, said pins being adapted to move in slots of guide members secured to the metal frame, an upper slot of each guide member having a curved upper portion and a linear portion extending from a lower end of the curved upper portion.

10. The container of claim 9 wherein the support is tubular.

11. The container of claim 9 wherein a portion of at least one of the slots of each guide member is linear.

12. The container of claim 9 wherein an upper a portion of each slot of each guide member is linear.

13. The container of claim 9 wherein each of the guide members has a pair of slots and the door assembly has one movable segment having multiple pins on each side of the movable door assembly adapted to move in the slots.

14. A container for holding product therein during shipment, the container comprising:
   a frame;
   a plurality of tracks secured to opposed sides of the frame at multiple spaced levels;
   a plurality of movable support member assemblies extending between opposed tracks of each level;
   dunnage supported by the support member assemblies;
   slotted guide members secured to the frame;
   a door assembly movable between a raised position and a lowered position, the door assembly having upper and lower pins on each side adapted to move in the slots of the guide members to guide the door assembly during movement, at least one of the slots of each guide member having a curved upper portion and a linear portion extending from a lower end of the curved upper portion, the upper pins of the door assembly being located at outer ends of the curved upper portions to maintain the door assembly in its raised position.

15. The container of claim 14 further comprising a stationary shield secured to the frame, the door assembly being generally parallel the shield when in its lowered position.

16. The container of claim 14 wherein the frame has a base and a sub-base spaced above the base.

17. The container of claim 14 wherein a portion of at least one of the slots of each guide member is linear.

18. A container for holding product therein during shipment, the container comprising:
   a frame;
   a plurality of tracks supported by opposed sides of the frame at multiple spaced levels;
   a plurality of movable support member assemblies extending between opposed tracks of each level;
   dunnage supported by the support member assemblies;
   guide members secured to the frame, each guide member having an upper slot and a lower slot, the upper slot having a curved upper portion and a linear portion extending from a lower end of the curved upper portion;
   a door assembly movable between a raised position and a lowered position, the door assembly having pins adapted to move in the upper and lower slots of the guide members to guide the door assembly during movement.

19. The container of claim 18 wherein the dunnage comprises pouches.

20. The container of claim 18 wherein the upper pins of the door assembly are located at outer ends of the upper portions of the upper slots to maintain the door assembly in its raised position.

21. The container of claim 18 wherein the frame has a base and a sub-base spaced above the base.

22. The container of claim 18 wherein the lower slot of each guide member has a linear portion.

* * * * *

UNITED STATES PATENT AND TRADEMARK OFFICE
CERTIFICATE OF CORRECTION

Page 1 of 1

PATENT NO. : 9,073,665 B2
APPLICATION NO. : 13/975682
DATED : July 7, 2015
INVENTOR(S) : Matthew S. Sanger It is certified that error appears in the above-identified patent and that said Letters Patent is hereby corrected as shown below:

In the Specification

Column 9

Line 65, "are damaged" should be ---is damaged---.

Line 65, "need to be" should be ---needs to be---.

Column 11

Line 25, "product" should be ---products---.

Line 27, "are pushed" should be ---is pushed---.

Line 39, "illustrates" should be ---illustrate---.

Line 59, "dunnage is moved" should be ---dunnage are moved---.

In the Claims

Column 16

Line 1, delete "an upper".

Signed and Sealed this
Seventeenth Day of November, 2015

Michelle K. Lee
*Director of the United States Patent and Trademark Office*